United States Patent
Yu et al.

(10) Patent No.: US 12,222,732 B2
(45) Date of Patent: Feb. 11, 2025

(54) AUTONOMOUS UNMANNED ROAD VEHICLE FOR MAKING DELIVERIES

(71) Applicants: Steven Sounyoung Yu, Fairfax, VA (US); Sounil Yu, Reston, VA (US)

(72) Inventors: Steven Sounyoung Yu, Fairfax, VA (US); Sounil Yu, Reston, VA (US)

( * ) Notice: Subject to any disclaimer, the term of this patent is extended or adjusted under 35 U.S.C. 154(b) by 3 days.

(21) Appl. No.: 18/154,124

(22) Filed: Jan. 13, 2023

(65) Prior Publication Data

US 2023/0176588 A1  Jun. 8, 2023

Related U.S. Application Data

(63) Continuation of application No. 15/648,532, filed on Jul. 13, 2017, which is a continuation of application No. 14/318,690, filed on Jun. 29, 2014, now Pat. No. 10,551,851.

(60) Provisional application No. 61/970,881, filed on Mar. 26, 2014, provisional application No. 61/921,464, filed on Dec. 28, 2013, provisional application No. 61/916,261, filed on Dec. 15, 2013, provisional application No. 61/909,227, filed on Nov. 26, 2013, provisional application No. 61/893,281, filed on Oct.
(Continued)

(51) Int. Cl.
| | |
|---|---|
| G05D 1/00 | (2024.01) |
| B60P 3/00 | (2006.01) |
| G05D 1/667 | (2024.01) |
| G06Q 10/08 | (2023.01) |
| G01S 7/481 | (2006.01) |

(52) U.S. Cl.
CPC ............ G05D 1/0297 (2013.01); B60P 3/007 (2013.01); G05D 1/024 (2013.01); G05D 1/667 (2024.01); G06Q 10/08 (2013.01); G01S 7/4813 (2013.01)

(58) Field of Classification Search
CPC .... G05D 1/0088; G06Q 10/087; G06Q 50/28; G06Q 10/08; G06Q 10/083
See application file for complete search history.

(56) References Cited

U.S. PATENT DOCUMENTS 9,235,213 B2 * 1/2016 Villamar ............... G06Q 10/087
9,256,852 B1 * 2/2016 Myllymaki ........... G06Q 10/083
(Continued)

FOREIGN PATENT DOCUMENTS

AU    2009264280 A1 * 12/2009 ............ G08G 1/091
WO    WO-2009156428 A1 * 12/2009 ............ G01C 21/34

OTHER PUBLICATIONS

Mays "Our view: 2009 smart ForTwo," Dec. 5, 2008 (Year: 2008).*
(Continued)

*Primary Examiner* — Peter D Nolan
*Assistant Examiner* — Michael F Whalen

(57) ABSTRACT

An autonomous unmanned road vehicle and how it can be used to make deliveries. The unmanned vehicle is capable of operating autonomously on paved roadways. The vehicle has a control system for autonomous driving and a perception system for detecting objects in its surroundings. The vehicle also has one or more cargo compartments for carrying the delivery items. The vehicle may have a flashing light beacon to increase the conspicuousness of the vehicle. In consideration that the vehicle does not carry passengers, the size and/or motor power of the vehicle may be reduced as compared to conventional passenger vehicles.

20 Claims, 10 Drawing Sheets

Related U.S. Application Data

20, 2013, provisional application No. 61/841,912, filed on Jul. 1, 2013.

(56) References Cited

U.S. PATENT DOCUMENTS

| | | | |
|---|---|---|---|
| 9,373,149 B2* | 6/2016 | Abhyanker | G05D 1/0238 |
| 2003/0033825 A1* | 2/2003 | Goosman | B60P 3/14 |
| | | | 62/323.3 |
| 2009/0320713 A1* | 12/2009 | Amiri | E01B 25/28 |
| | | | 280/1 |
| 2010/0106298 A1* | 4/2010 | Hernandez | G05D 1/0217 |
| | | | 700/250 |
| 2010/0234990 A1* | 9/2010 | Zini | G05D 1/0274 |
| | | | 700/245 |

OTHER PUBLICATIONS

"Edmunds Used 2009 smart fortwo Features and Specs" (Year: 2009).*

"2013 Smart Fortwo Electric Drive First Drive," MotorTrend, Oct. 23, 2012 (Year: 2012).*

* cited by examiner side view top view rear view side view top view front view top view

AUTONOMOUS UNMANNED ROAD VEHICLE FOR MAKING DELIVERIES

RELATED APPLICATIONS

This application claims the benefit of U.S. Provisional Applications Ser. No. 61/841,912 (filed 1 Jul. 2013), No. 61/893,281 (filed 20 Oct. 2013), No. 61/909,227 (filed 26 Nov. 2013), No. 61/916,261 (filed 15 Dec. 2013), No. 61/921,464 (filed 28 Dec. 2013), and No. 61/970,881 (filed 26 Mar. 2014), all of which are incorporated by reference herein.

TECHNICAL FIELD

Our invention relates to using autonomous (e.g. driverless or self-driving) vehicles for making deliveries.

BACKGROUND

In the transportation and logistics industry, the "last mile" problem refers to the delivery of goods to the final destination. There are many challenges to making delivery to the final destination. Some examples include theft of packages if they are left on the doorstep of the recipient's home, having to schedule a delivery time with the recipient, having to skip the delivery and return another day, leaving the package with an unreliable concierge or roommate, requiring the presence of the recipient at an inconvenient time, or requiring the recipient to travel to a special locker or other designated location to pickup their package. We propose using an autonomous unmanned road vehicle for an improved delivery service.

SUMMARY

Our invention relates to autonomous unmanned road vehicles and how they can be used to make deliveries. In one embodiment, our invention is a method of transporting tangible goods. The method comprises loading multiple packages onto a transport vehicle at a regional distribution facility. The packages are destined for multiple delivery destinations that are designated by different postal addresses. The packages are transported to a local distribution facility via the transport vehicle. The recipients are notified that their packages are ready for delivery. After receiving a delivery request notification from a recipient, the package is loaded onto an autonomous unmanned ground vehicle. The unmanned ground vehicle is driven on a paved roadway to the recipient's delivery destination. The recipient is notified that their package has arrived or will be arriving. The package is then delivered to the recipient's delivery destination. In some embodiments, the method further comprises: sending an access code to the recipient for accessing the package; accepting the correct access code entered by the recipient; and allowing access to the package.

Another method for transporting tangible goods comprises loading multiple packages onto an autonomous unmanned ground vehicle for delivery to multiple delivery destinations that are designated by different postal addresses. The unmanned vehicle is driven on a paved roadway to a waiting area. At least 85% of the delivery destinations are within a 6 mile radius of the waiting area. The recipients are notified that their packages are ready for delivery. After receiving a delivery request notification from a recipient of a package, the vehicle is driven to the recipient's delivery destination. The recipient is notified that their package has arrived or will be arriving. The package is delivered at the recipient's delivery destination. The vehicle may then return to the same waiting area or go to a different waiting area. In some embodiments, the method further comprises: sending an access code to the recipient for accessing the package; accepting the correct access code entered by the recipient; and allowing access to the package.

Another embodiment of our invention is a system for delivering tangible goods. The system comprises a regional distribution facility and a local distribution facility that receives packages from the regional distribution facility. The packages received by the local distribution facility are destined for multiple delivery destinations that are designated by different postal addresses. The system further comprises an autonomous unmanned ground vehicle for delivering the packages to the delivery destinations and an operations hub having equipment to communicate with the unmanned vehicle and the recipients of the packages.

In another embodiment, the system comprises: a distribution facility that receives packages that are destined for multiple delivery destinations that are designated by different postal addresses; an autonomous unmanned ground vehicle for delivering the packages to the delivery destinations; an operations hub having equipment to communicate with the unmanned vehicle and the recipients of the packages; and a waiting area where the unmanned ground vehicle can park while awaiting a delivery request.

Another embodiment of our invention is a method of transporting packages that are destined for multiple delivery destinations using an autonomous unmanned ground vehicle. The packages are transported from a first location to a second (intermediate) location. The recipients of the packages are notified that their packages are ready for delivery. After receiving a delivery request notification from a recipient of a package, the unmanned ground vehicle that is loaded with the recipient's package is driven from the intermediate location to the recipient's delivery destination. The recipient is notified that their package has arrived or will be arriving. After delivering the package, the vehicle is driven back to the intermediate location.

Another embodiment of our invention is a method of delivering retail goods to customers on-demand. The method comprises receiving a purchase order from a customer for delivery to a delivery destination (the purchase order comprising a purchased item). At a local retail facility located within a 6 mile radius of the delivery destination, the purchased item is put into delivery packaging. A message is sent to the customer that their purchase order is ready for delivery. The customer's delivery request is received at a time after the purchase order is received. After receiving this delivery request, the delivery packaging containing the customer's purchased item is loaded into an autonomous unmanned ground vehicle, which is driven to the customer's delivery destination. The customer is notified that their purchase order has arrived or will be arriving. The purchased item is delivered at the customer's delivery destination.

In some cases, the purchase order includes a cold food item that is put into a separate delivery packaging. In some cases, while awaiting the delivery request, the delivery packaging holding the cold food item is kept in a refrigerated space at the local retail facility. In some cases, the vehicle has a cold compartment that is thermally insulated and/or cooled, and the container holding the cold food item is loaded into the cold compartment. In some cases, the container for the cold food item is reusable, and after making the delivery, the vehicle stands by and waits until the container is returned to the vehicle, and departs afterwards.

In some cases, the purchased item is held in a cargo compartment in the unmanned ground vehicle, and the method further comprises: sending an access code to the customer for accessing the cargo compartment; accepting the entry of a correct access code; and allowing access to the cargo compartment.

Another embodiment of our invention is a delivery system for delivering retail goods to customers. The system comprises a local retail facility that has an inventory of retail goods and is located within a 6 mile radius of the customers' residences. The delivery system further comprises a computer system for receiving purchase orders of retail goods from customers and an autonomous unmanned ground vehicle for delivering the purchase orders to the customers' residences. The delivery system further comprises an operations hub having equipment to communicate with the unmanned vehicle and the customers. In some cases, the local retail facility operates both as a walk-in retail store and a delivery service of retail goods. In some cases, the delivery service is operated out of one or more back rooms/areas of the local retail facility.

Another embodiment of our invention is another method for transporting tangible goods. The method uses a home base facility that has a fleet of autonomous unmanned ground vehicles. After receiving a request from a sender for delivery of an item from the sender's designated location to a recipient at the recipient's location, an unmanned vehicle is selected for the sender's request. The selected vehicle may or may not be located at the home base facility. The unmanned ground vehicle is driven to the sender's designated location. The sender is notified that the unmanned ground vehicle has arrived or will be arriving. At the sender's designated location, the item is received into the unmanned ground vehicle. The unmanned ground vehicle is driven to the recipient's location. The recipient is notified that the unmanned ground vehicle has arrived or will be arriving. The item is delivered at the recipient's location.

Another embodiment of our invention is another system for transporting tangible goods. The system comprises a fleet of autonomous unmanned ground vehicles and a home base facility where the unmanned ground vehicles are kept. The system further comprises an operations hub for coordinating the use of the unmanned ground vehicles. The unmanned ground vehicles operate only in an area that is contained within a 15 mile radius around the home base facility.

Another embodiment of our invention is a method for transporting tangible goods over a regional area. The method uses a fleet of autonomous unmanned ground vehicles and multiple home base facilities that are geographically separated in an area contained within a circle having a radius of 64 miles. After receiving a request from a sender for delivery of an item from the sender's designated location to a recipient at the recipient's location, an unmanned vehicle is selected for the sender's request. The selected vehicle may or may not be located at a home base facility. The unmanned ground vehicle is driven to the sender's designated location. The sender is notified that the unmanned ground vehicle has arrived or will be arriving. At the sender's designated location, the item is received into the unmanned ground vehicle. The unmanned ground vehicle is driven to the recipient's location. The recipient is notified that the unmanned ground vehicle has arrived or will be arriving. The item is delivered at the recipient's location. The overall area in which the vehicle operates is contained within two or more adjoining or overlapping circles that each have a radius of 9 miles around a home base facility.

Another embodiment of our invention is a system for transporting tangible goods over a regional area. The system comprises a fleet of autonomous unmanned ground vehicles and a network of multiple home base facilities geographically separated in an area contained within a circle having a radius of 64 miles. The system further comprises an operations hub for coordinating the use of the unmanned ground vehicles. The unmanned ground vehicles operate only in an area that is contained within two or more adjoining or overlapping circles that each have a radius of 9 miles around a home base facility.

BRIEF DESCRIPTION OF THE DRAWINGS

FIGS. 8 and 9 show different views of the back of the supermarket store. FIG. 10 shows the delivery vehicle loaded with a customer order.

DETAILED DESCRIPTION

Figure 1A:
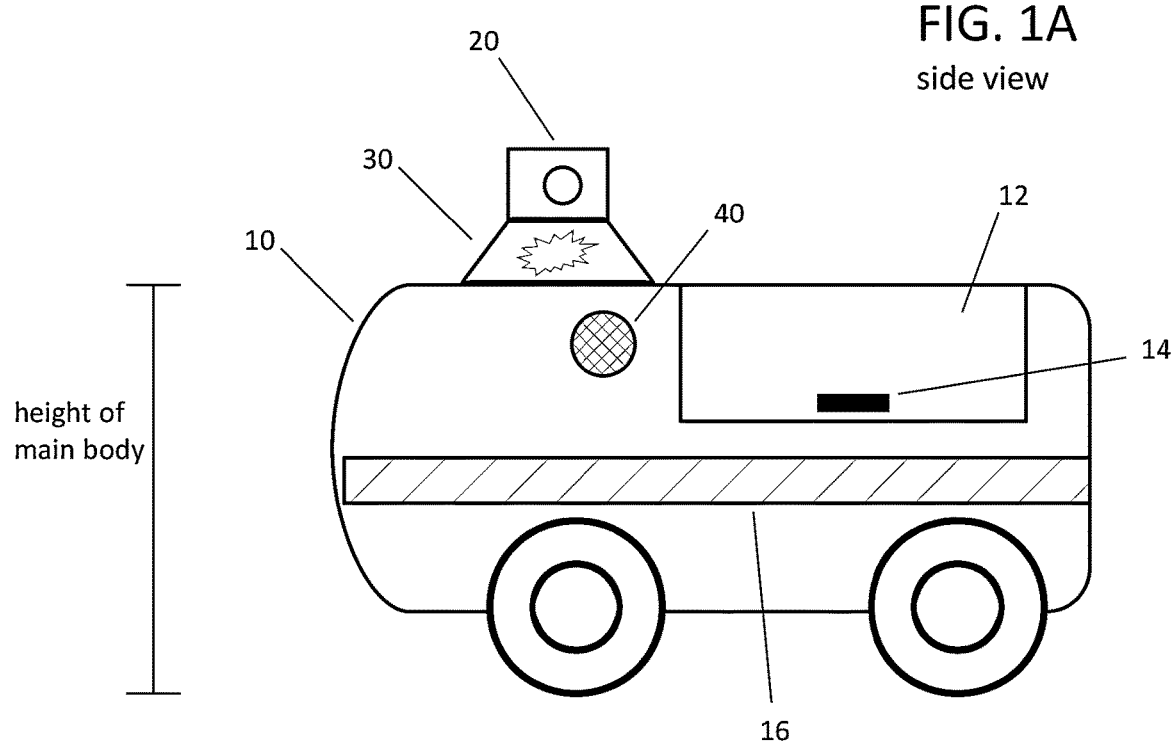
FIGS. 1A-1C show different views of an autonomous unmanned road vehicle as an example of our invention.
Figure 1B:
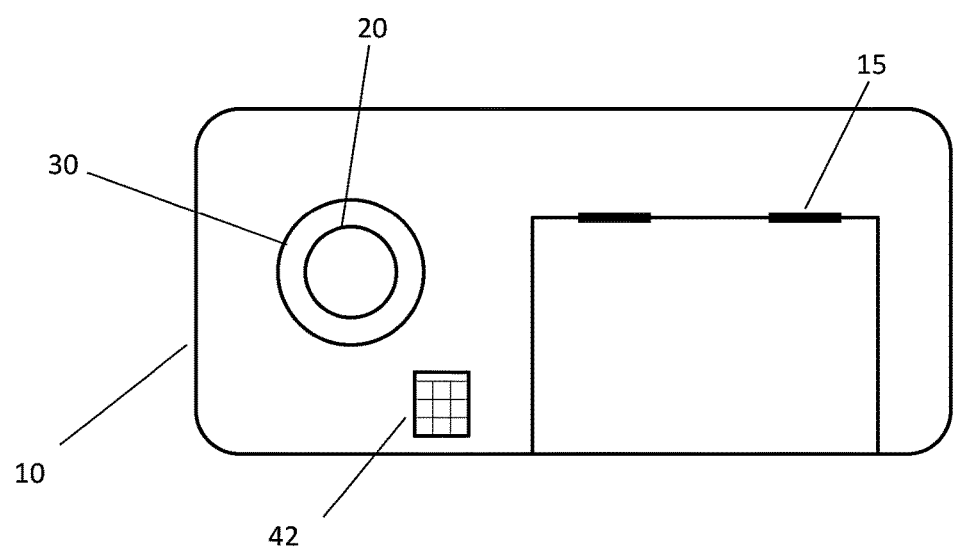
Figure 1C:
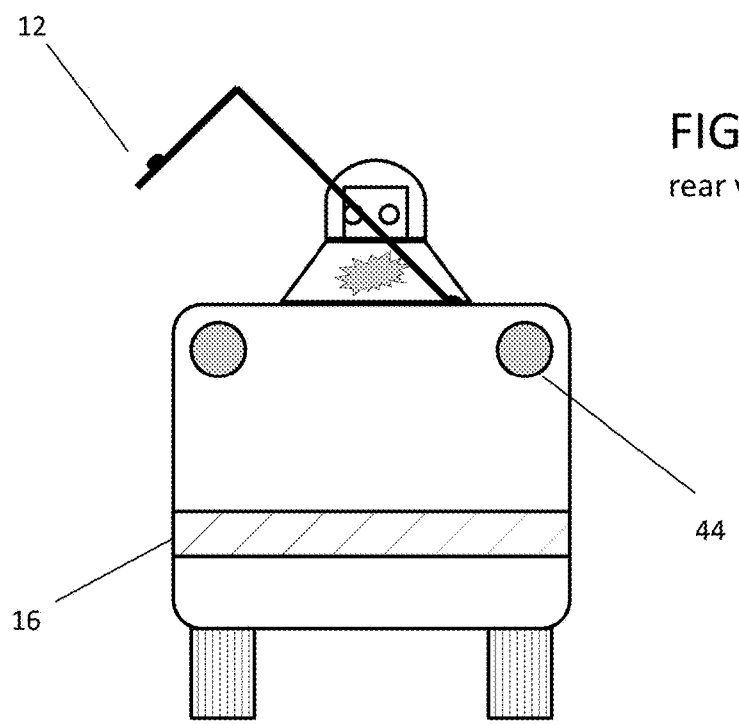

Our invention contemplates the use of the unmanned ground vehicle for transporting tangible goods, such as packages, retail goods, or other items. An example of the unmanned ground vehicle is shown in FIGS. 1A-1C, which will be explained in further detail below. The unmanned vehicle is designed to be capable of operating autonomously (e.g. navigating and driving) on paved roadways (e.g. paved with asphalt, concrete, or composites) that are ordinarily used for motor vehicle traffic. Examples of paved roadways include streets, roads, highways, freeways, avenues, boulevards, bridges, tunnels, etc. The paved roadways may be public or private. The paved roadways may have traffic lanes, pavement markings, traffic signals or traffic signs, speed limits, median dividers between opposite-direction traffic, or other typical features of roadways. The paved roadways may be designated with identifying names (e.g. Main Street) or numbers (e.g. Route 101) by a government authority (e.g. municipal government).

For operating on paved roadways, the autonomous driving capabilities of the unmanned vehicle may include obeying traffic signals and/or signs; obeying speed limits; making turns at intersections; observing pavement line markings and staying within travel lanes; changing lanes; avoiding other vehicles on the roadway and maintaining a safe distance with the vehicle ahead; avoiding pedestrians and stopping for pedestrians crossing the roadway or school buses; giving signals (e.g. braking light, turn signal, etc.) to other vehicles or other drivers; reducing speed for shopping centers, parking lots, downtown areas, vicinity of schools, vicinity of playgrounds, in vicinity of pedestrians, and/or residential roadways; parking in designated areas or according to parking rules or regulations; entering and exiting limited access highways (e.g. interstate highways), and/or other such capabilities. The vehicle's control system may include a navigation system that is capable of autonomously driving the vehicle to specific coordinates, landmarks, or street address locations (e.g. 1250 Main Street, Anytown, MA 90210, a fictitious address).

The vehicle's navigation system may use a map that, in addition to the conventional roadway and navigational information, further contains specific information about traffic or roadway infrastructure features. Examples of such specific information include location of off-site parking spaces; location of curbside parking spaces; which lanes to use during travel or making turns; locations and orientations of traffic signals (such as signal lights and stop signs); speed limits; location of residential, commercial, and/or industrial areas; traffic patterns; road conditions such as the location speed bumps or potholes; location of intersections; location of pedestrian crossings and areas frequented by pedestrians; location of road construction sites, etc. In addition to location information, other types of information that may be associated include timing, orientation, tolls/fees, times of availability, etc. This information may be acquired in any suitable manner, such as by additional pre-navigation and mapping of the area in which the vehicle will be operated.

Perception System

The vehicle has a computer control system for its autonomous driving capability and has a perception system for detecting objects in its surroundings. The "perception system" includes a perception apparatus to collect image information and other components for processing the image information, such as associated computer hardware and software. The "perception apparatus" includes the sensor eye and other associated components, such as sensors, detectors, emitters (e.g. radio, conventional light, laser), drive motors and mechanical parts, mirrors, etc. Examples of perception apparatus include cameras, lidar, radar, sonar, etc. The sensor eye is the part of the perception apparatus where it directly receives its "point-of-view" of the environment (e.g. the opening, lens, or window through which light enters the perception apparatus).

The perception apparatus may use any of various types of sensors, including photodetectors (e.g. in a camera or lidar), radar receiver, or sonar receiver. The vehicle's perception system may use a single or multiple different modalities. In some embodiments, the perception apparatus uses a photodetector, such as an optical image sensor in a camera or photodiodes in a lidar.

The perception apparatus may be one of the more expensive components of the vehicle. Moreover, the perception apparatus may be vulnerable to potentially damaging external forces, such as vandalism, weather conditions, debris, etc. Thus, in some embodiments, the perception apparatus may be enclosed in a protective housing that is at least partially transparent, such as a polycarbonate or poly (methyl-methacrylate) dome.

In some embodiments, the perception apparatus can be put into a protected mode in which it is shielded or otherwise protected from these potentially damaging external forces. The perception apparatus can be put into the protected mode in appropriate circumstances such as when the vehicle is not driving, when a threat is detected, when parked, when under attack, when the vehicle is disabled, etc. The perception apparatus can be switched from the operational mode to the protected mode and vice versa.

Figure 2A:
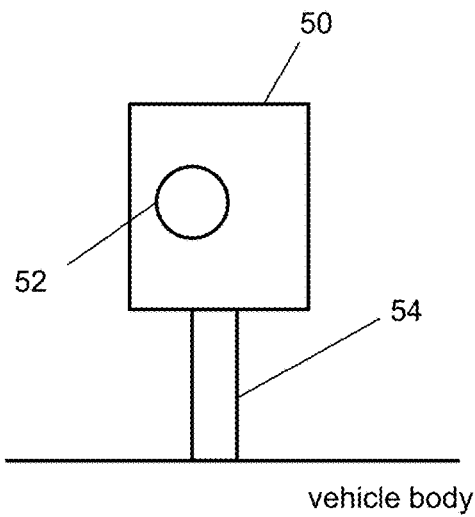
FIG. 2A shows a lidar apparatus in operating mode when the vehicle is traveling.
Figure 2B:
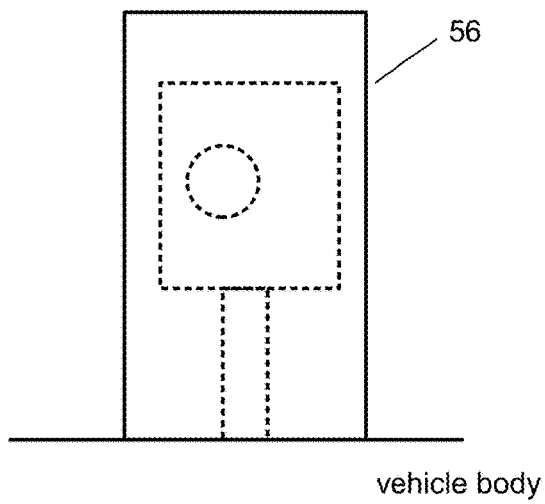
FIG. 2B shows the lidar apparatus in protected mode inside of a metal shield when the vehicle is parked.
Figure 3A:
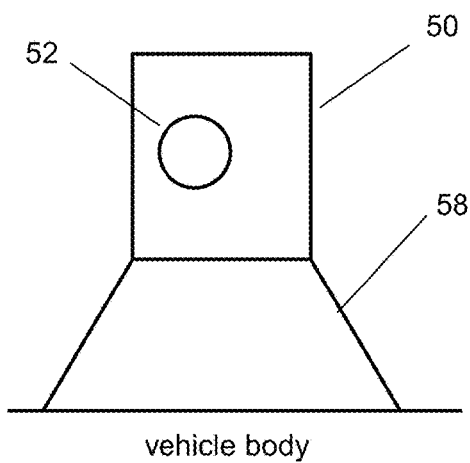
FIG. 3A shows a lidar apparatus in operating mode when the vehicle is traveling.
Figure 3B:
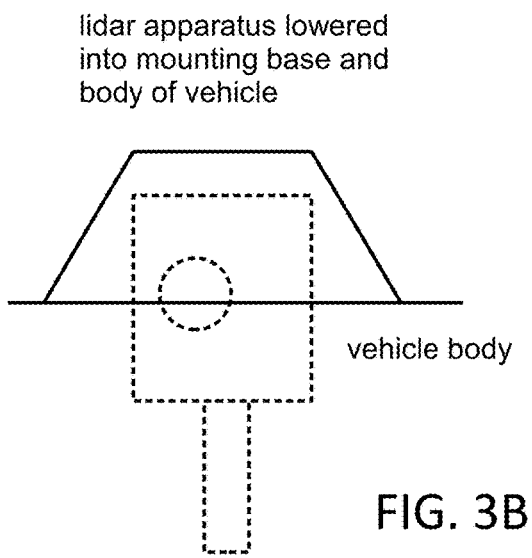
FIG. 3B shows the lidar apparatus lowered into the mounting base and body of the vehicle when the vehicle is parked.

This protected mode can be provided by any suitable mechanism such as a shield being raised around the perception apparatus or it being retracted into an internal part of the vehicle. For example, FIG. 2A shows the lidar apparatus 50 (with sensor eye 52 and mounted on a stalk 54) in operating mode when the vehicle is driving. But as shown in FIG. 2B, when the vehicle is parked, the lidar apparatus 50 is put in protected mode with a metal shield 56 being raised around the lidar apparatus 50. In another example, FIGS. 3A and 3B show the lidar apparatus 50 put into protected mode by retracting it into the mounting base 58 and the body of the vehicle when parked. We consider that this particular feature of the perception apparatus having a protected mode can be used with any autonomous ground vehicle, such as self-driving passenger vehicles, and not necessarily limited to the passengerless delivery vehicles described herein.

Light Beacon

In some embodiments, the vehicle has a flashing light beacon (e.g. on the roof of the vehicle) that operates while traveling on a roadway. This may be useful to increase the conspicuousness of the vehicle. The flashing may be produced in any suitable manner, including electrically-produced (e.g. strobing as a burst-like flash or pulsing) or mechanically-produced (e.g. rotating light beam or reflective shield).

Since the unmanned vehicle does not pose a danger to anyone, the light beacon may be designed to operate in a manner that avoids causing annoyance, distraction, alarm, fright, or sense of potential danger or urgency, such as causing other drivers to pull over to the side of the road or causing pedestrians to be afraid of crossing the street when an unmanned vehicle approaches. This can be achieved by using a slower flash rate, lower luminous intensity, selecting the color of the light, selecting the type of flashing, or reducing the number of flashing lamps in the light beacon. In some embodiments, none of the light beacon(s) on the vehicle produce a strobing-type flash, which can be unnecessarily annoying, distracting, or alarming to people. In some embodiments, only mechanically-produced flashing is used for light beacon(s) on the vehicle. In some embodiments, no strobing-type flashing is used for any light beacon(s) on the vehicle.

In some embodiments, the flash rate of the light beacon is relatively slow. In some cases, the flash rate of the light beacon is slower than 120 per minute; in some cases, slower than 105 per minute; in some cases, slower than 90 per minute; in some cases, slower than 75 per minute; in some cases, slower than 60 per minute; in some cases, slower than 45 per minute. As used herein, "flash rate" means the rate as discerned by ordinary, unassisted human perception. For example, some conventional warning lights emit double flashes or quad flashes (i.e. two quick flashes or four quick flashes that are perceived as a single flash). In such a case, each double flash or quad flash would be counted as a single flash.

The light beacon may have one or more flashing lamps. If the light beacon has multiple flashing lamps, in some cases, the lamps may flash synchronously, alternately, or some other pattern. If the light beacon has multiple flashing lamps, in some cases, the multiple lamps flash only in an alternating pattern. In some cases, the light beacon has only a single or at most two flashing lamps. This may be useful because having too many flashing lamps can be unnecessarily annoying, distracting, or alarming to people.

In some embodiments, each flash of the light beacon has relatively lower luminous intensity (candela) than beacons used on emergency or hazard vehicles. In some cases, the light beacon is designed to operate such that each flash has a luminous intensity of less than 800 cd (candela) in full daylight conditions; in some cases, less than 600 cd; in some cases, less than 500 cd; and in some cases, less than 400 cd. This feature does not exclude the possibility that there may be other intensities used for operating in other or intermediate lighting conditions, such as night, dawn/dusk, rain, fog, etc. The luminous intensity can be measured using conventional instruments such as a photometer.

For the light beacon, it may be desirable to avoid colors that are associated with emergencies or hazard vehicles. In some embodiments, the vehicle has one or more light beacons, but none are blue. In some embodiments, the vehicle has one or more light beacons, but none are red. In some embodiments, the vehicle has one or more light beacons, but none are amber. Combinations of the preceding are also possible (e.g. not blue nor red). In some embodiments, the light beacon uses only non-emergency colors, such as white, amber, yellow, yellow-orange, orange, green, green-yellow, purple, or violet.

In order to avoid interfering with the perception system, in some embodiments, the light spectrum emitted by the light beacon is different from the light spectrum emitted (if it does so) by the perception apparatus. In order to avoid interfering with the perception apparatus, in some embodiments, the light beacon may be positioned at an elevation that is different from the sensor eye of the perception apparatus. For example, the light beacon may be positioned at an elevation above or below that of the sensor eye. Setting the sensor eye of the perception apparatus at an elevation higher than the light beacon can improve the field of perception, especially if the vehicle has a relatively lower height.

Figure 5A:
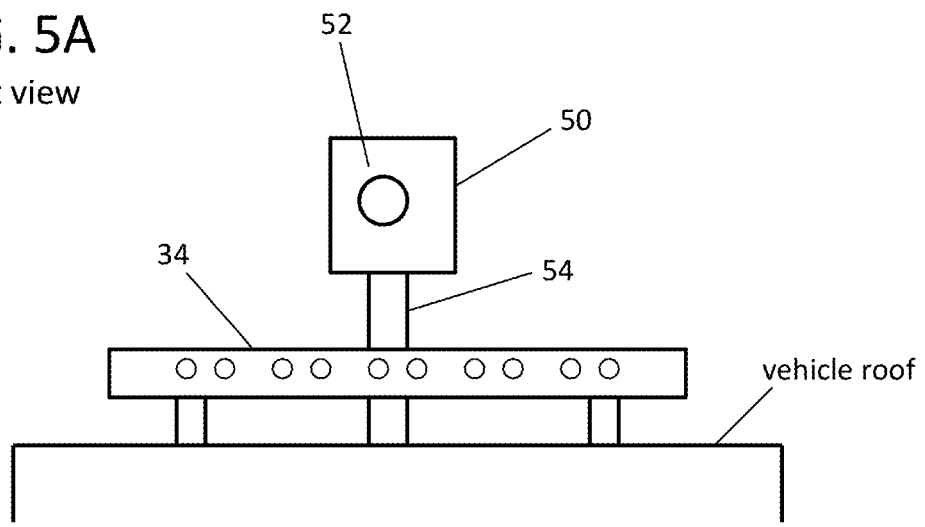
FIG. 5A shows a front view of a perception apparatus mounted on a stalk such that the sensor eye is elevated above the level of the flashing light beacon.
Figure 5B:
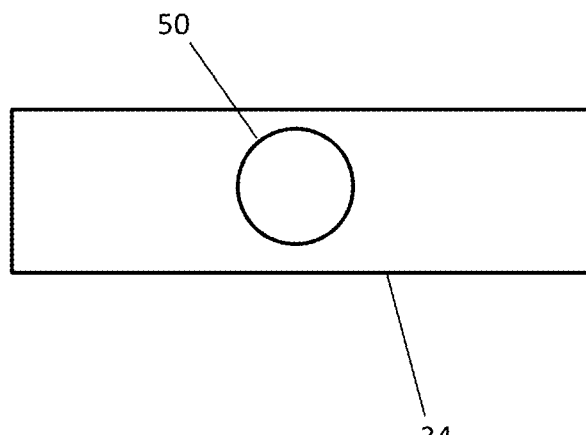
FIG. 5B shows an overhead view.

In some embodiments, the light beacon and the perception apparatus are mounted above or below each other with at least some part of the perception apparatus vertically overlapping with at least some part of the light beacon. For example, FIG. 5A shows the perception apparatus 50 mounted on a stalk 54 such that the sensor eye 52 is elevated above the level of the flashing light beacon 34. Moreover, as shown in FIG. 5B, there is vertical overlap of the perception apparatus 50 and the flashing light beacon 34 from the overhead view.

Figure 4A:
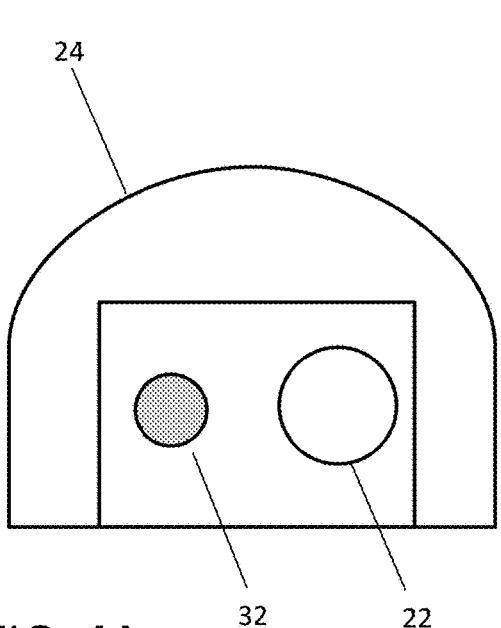
FIG. 4A shows a side view of a light beacon and perception apparatus integrated into a rotating cylinder.
Figure 4B:
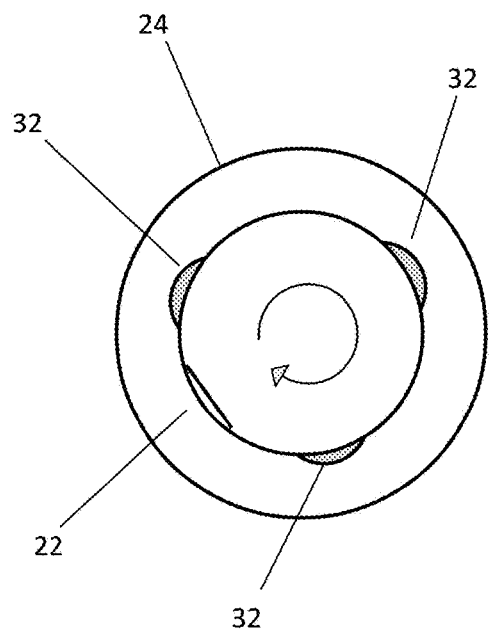
FIG. 4B shows an overhead view.

In some cases, both the light beacon and the perception apparatus are mounted on the same upwardly protruding structure on top of the vehicle (e.g. on a stalk or mounting base). In some cases, both the light beacon and the perception apparatus are positioned on the same vertically-extending axis. In some cases, both the light beacon and the perception apparatus are made to spin on the same vertically-extending axis. In such cases, the light beacon and the perception apparatus may rotate synchronously. For example, FIGS. 4A and 4B show the light beacon and perception apparatus being integrated into a rotating cylinder and housed within a protective glass dome 24. There are three lamps 32 on the cylinder that spins in the direction shown by the arrow. The sensor eye 22 (i.e. a window in the cylinder) of the perception apparatus is positioned between two of the lamps 32 and rotates together with the lamps 32.

Vehicle Color & Graphics

In some embodiments, at least some part of the vehicle is given a feminine color. This may be useful in deterring hostile physical actions (e.g. vandalism) against the vehicle. The term "feminine color" as used herein means a color that is generally considered by Americans to be more feminine than being masculine or neutral. This can be determined by a market research survery asking people whether they believe that a particular color is feminine, masculine, or neutral. The survey would be on a sample of adults in America who received their entire K-12 (kindergarten through grade 12) schooling in America, and the survey group composition being equally male and female in number. Examples of feminine colors include pink and pastel colors. The feminine color may be the predominant color of the vehicle (e.g. the base paint color) or may play a lesser role (e.g. part of the graphics).

In some embodiments, the exterior of the vehicle displays an image of a female person (e.g. photo or illustration) or female character (e.g. cartoon drawing or figure, such as Tinker Bell). In some cases, the female person or character in the image is smiling. This may be useful in deterring hostile physical actions (e.g. vandalism) against the vehicle. In some embodiments, the vehicle has an anti-graffiti surface provided by a specialized anti-graffiti coating, paint, film, etc.

Speed Limit

Because the vehicle may have a relatively smaller size, relatively weaker motor power, and/or relatively more unstable aerodynamics, the vehicle may travel at a relatively slower speed as compared to conventional passenger cars. In some embodiments, the speed of the vehicle is limited to a maximum allowable speed V (e.g. having a speed governor), with V being a value of 65 mph or less (e.g. V=57 mph or V=48 mph); in some cases, V being a value of 60 mph or less; in some cases, V being a value of 55 mph or less; in some cases, V being a value of 50 mph or less; in some cases, V being a value of 45 mph or less. In some embodiments, the vehicle does not operate on roadways having a speed limit of 50 mph or greater; in some cases, on roadways having a speed limit of 55 mph or greater; in some cases, on roadways having a speed limit of 65 mph or greater (e.g. does not operate on interstate highways).

However, because the vehicle is designed for traveling on conventional roadways, the vehicle is capable of maintaining speeds to keep pace with traffic. As such, in some cases, the vehicle is capable of traveling at speeds faster than 25 mph; and in some cases, faster than 35 mph; and in some cases, faster than 45 mph.

Technical Problems

The unmanned vehicle's control system may be programmed to monitor the condition of the vehicle. In some embodiments, the control system assesses technical problems being experienced by the vehicle, and if needed, the control system drives the vehicle to travel to a base facility (such as the nearest distribution facility, retail facility, or home base facility as will be described below) or to park itself (preferably at a safe place away from the flow of traffic). The vehicle may park at any suitable place, such as on the side of the road (e.g. on the shoulder), at an on-street parking site, or off-street parking site. Afterwards, the vehicle may standby and await the arrival of a recovery truck.

The technical problems that can trigger this response may include one or more of: mechanical problem (e.g. flat tire), electrical problem (e.g. light beacon not working), electromechanical problem (e.g. electric motor malfunction), communication problem (e.g. loss of communication link), low battery charge, or low fuel. Detection and/or response to the problem may be performed autonomously or semi-autonomously (i.e. under a combination of human and autonomous control). For example, the vehicle may detect and assess the technical problem on its own and find safe parking on its own; or the problem may be assessed at the operations hub and the operations hub commands or guides the vehicle to a safe parking area; or some combination of these actions.

In some embodiments, this response is triggered by the remaining battery charge falling below some threshold P, wherein P has a value in the range of 20% to zero (e.g. triggered when less than 17% battery charge remaining); in some cases, P has a value in the range of 15% to zero; in some cases, P has a value in the range of 10% to zero. In some embodiments, this response is triggered by the remaining amount of fuel falling below some threshold F, wherein F has a value in the range of 20% to zero (e.g. triggered when less than 18% fuel remaining); in some cases, F has a value in the range of 15% to zero; in some cases, F has a value in the range of 10% to zero.

Surveillance System

In some embodiments, the vehicle has a surveillance system that operates separately or in conjunction with the perception system. The surveillance system may share the same components as the perception system, such as using the same camera(s). The surveillance system is designed to counter hostile physical actions against the vehicle, such as vandalism. As such, the surveillance system may be operating during a time when the vehicle is not traveling or when the driving perception system is not active. For example, the surveillance system may be operating when the vehicle is parked.

The surveillance system includes a multidirectional camera system that has one or more cameras for imaging in multiple directions. A variety of different configurations are possible for the camera system. For example, the camera system may have a single camera that can turn to different directions, or multiple cameras that are pointed in different directions. The cameras used may be the same or different from any cameras used in the perception system. The camera can be made to be easily visible or conspicuous to deter hostile physical actions against the vehicle (e.g. vandalism, theft, or aggressive driving against the vehicle).

Warning Sign

The vehicle may be the target of hostile physical actions, such as vandalism or other drivers on the road interfering with the operation of the vehicle (e.g. bump into it, nudge it, push if off the road, block its path, etc.). To deter this kind of hostile action, the vehicle may display an externally visible written warning notice. Examples of such warning notices include: "Vehicle Under Video Surveillance" or "Do Not Interfere with this Vehicle/Violators Will be Prosecuted." Other methods for countering against hostile physical actions are also described herein.

Communications Equipment

The vehicle is equipped with radio communications equipment such as a receiver, transmitter, transceiver (e.g. cellular radio transceiver), and/or antenna. The radio communications equipment may be used for communicating with the operations hub and/or the customers. The radio communications equipment may operate via any suitable radio link such as a cellular network, WiFi, satellite, or combinations thereof. The radio communications equipment may be integrated with or in connection with the control system, surveillance system, and/or perception system of the vehicle.

The vehicle may have audio and/or visual equipment to communicate with people standing near the vehicle. In some embodiments, the vehicle has an external loudspeaker, external microphone, and/or external video display screen. These can be useful in a variety of circumstances. For example, the external loudspeaker can be used to talk with the delivery recipient or passerby, or to ward off vandals (e.g. "please step away from the vehicle"), or make requests (e.g. "please move out of the way").

The microphone can allow the delivery recipient or passerby to speak with someone at the operations hub for the vehicle. For example, if the vehicle is improperly parked, a policeman can speak into the microphone to ask the operations hub to move the vehicle; or for example, a bystander can ask the operations hub to move the vehicle because it is blocking the way.

In some embodiments, the vehicle has an electronic payment device (e.g. credit card reader, smartphone payment processor, etc.). In some cases, the electronic payment device is involved in unlocking or opening a cargo compartment door of the vehicle. For example, when the recipient makes a payment with the electronic payment device, the compartment door is unlocked so that the recipient can access the delivered item.

Vehicle Suspension & Body

Since the vehicle is not designed to carry passengers, the suspension design can be different from those typically used in contemporary passenger cars. In some embodiments, the vehicle has a suspension that uses springs (e.g. coil, leaf, etc.), but no damping mechanism (e.g. no shock absorbers). In some embodiments, the vehicle does not have a fully independent suspension system on all wheels. In such cases, only the front wheels, or only the rear wheels, or neither have an independent suspension. That is, the vehicle can have a suspension configuration with: (1) the front wheels are independently linked, but the rear wheels are dependently linked; (2) the rear wheels are independently linked, but the front wheels are dependently linked; (3) both the front and rear wheels are dependently linked.

The vehicle may have 3-6 wheels. In some embodiments, the vehicle is steered at both the front and rear wheels (e.g. 4-wheel steering). This can allow crab steering to facilitate parallel parking curbside. In some embodiments, the vehicle has wheels without separate tires, or has tires that are non-pneumatic (e.g. solid rubber tires or the Tweel made by Michelin) or semi-pneumatic. Semi-pneumatic tires have a hollow air-filled center, but the air is not pressurized. This feature can be useful in making the vehicle more resistant to vandalism (e.g. tire slashing). This feature can also be useful for reducing the maintenance cost of the vehicle. Also, since the vehicle is not designed to carry passengers, not being constrained by personal comfort considerations can lower the cost of the vehicle.

Because the vehicle may be relatively lightweight, it may experience instability at higher travel speeds. Vehicle stability can be enhanced by aerodynamic design of the vehicle for reducing air turbulence around the vehicle, reducing aerodynamic lift, and/or produce downforce on the vehicle.

Such designs can include shaping the vehicle body appropriately (e.g. a wedge shaped front), giving the vehicle a spoiler (to reduce turbulence and aerodynamic lift), and/or giving the vehicle a wing to produce downforce.

Operations Hub

Coordination of the delivery operations may be performed by an operations hub. To perform this, the operations hub may have personnel and equipment to remotely operate the vehicle, communicate with the vehicle (e.g. for sending commands, receiving monitoring information from the vehicle, etc.), and/or remotely monitor the vehicle.

The operations hub can also communicate with any of the facilities described below (e.g. distribution facility, home base facility, local retail facility). Communications with the customer or recipient (sending and receiving) can be performed by operations hub or by the vehicle itself, and can be made via any suitable medium, such as through wired or wireless communication devices such as mobile phones, desktop computers, home control panel (for a home automation system), etc. The communications with the customer or recipient may be in the form of phone calls, voice messages, emails, text messages, message alerts, or any other sui table means of notification.

The operations hub may be a single physical location or multiple physical locations that functionally work together. The operations hub may be physically and/or functionally combined or integrated with any of the facilities described below (e.g. distribution facility, home base facility, local retail facility), or it may be separate functionally and/or physically.

In some embodiments, the person who remotely operates the unmanned vehicle has a driver's license in the state where the vehicle is being operated. The operations hub may be handling the operation of multiple unmanned ground vehicles. In some cases, the operations hub is in command of 10 or more vehicles; in some cases, 15 or more vehicles; in some cases, 25 or more vehicles.

Vehicle Dimensions

Because the vehicle should be large enough to carry cargo, the unmanned vehicle may have a dry (empty) weight of at least 450 lbs; in some cases, at least 550 lbs; in some cases, at least 700 lbs. But because the vehicle does not carry passengers, typical human comfort and safety features can be omitted, thus reducing the weight of the vehicle. As such, the unmanned vehicle may have a dry (empty) weight of less than 7,000 lbs; in some cases, less than 5,000 lbs.; in some cases, less than 3,000 lbs.; in some cases, less than 2,000 lbs.; in some cases, less than 1,500 lbs.

In some embodiments, the unmanned vehicle has a wheelbase of at least 30 inches; in some cases, at least 40 inches; in some cases, at least 60 inches; in some cases, at least 75 inches. In some embodiments, the unmanned vehicle has a wheelbase of less than 210 inches; in some cases, less than 170 inches; in some cases, less than 150 inches; in some cases, less than 130 inches; in some cases, less than 105 inches.

In some embodiments, the unmanned vehicle has a maximum payload capacity of at least 75 lbs; in some cases, at least 150 lbs; in some cases, at least 200 lbs; in some cases, at least 300 lbs; in some cases, at least 400 lbs; in some cases, at least 600 lbs; in some cases, at least 800 lbs. In some embodiments, the unmanned vehicle has a maximum payload capacity that is less than 2,000 lbs; in some cases, less than 1,500 lbs; in some cases, less than 1,200 lbs; in some cases, less than 900 lbs.

In some embodiments, the unmanned vehicle has a total cargo volume of at least 20 cu ft; in some cases, at least 40 cu ft; in some cases, at least 60 cu ft; in some cases, at least 90 cu ft. In some embodiments, the vehicle has a total cargo volume of less than 600 cu ft; in some cases, less than 400 cu ft; in some cases, less than 200 cu ft; in some cases, less than 100 cu ft.

Examples of vehicle dimensions that may be suitable include those similar to the Smart™ electric minicar, 4-wheel all-terrain or sport utility vehicles (ATV), or golf carts.

Since the unmanned ground vehicle is not designed to carry passengers, it can have a relatively narrower width. In some embodiments, both the front and rear track widths of the vehicle are narrower than 80 inches; in some cases, narrower than 75 inches; in some cases, narrower than 70 inches; in some cases, narrower than 65 inches; in some cases, narrower than 60 inches; in some cases, narrower than 55 inches; in some cases, narrower than 50 inches; in some cases, narrower than 45 inches; in some cases, narrower than 40 inches.

In some embodiments, the main body of the unmanned vehicle has a height of less than 8 feet (not including projecting elements such as antennas, cameras, signal lights, perception apparatus, light beacons, or other accessory elements, etc.); in some cases, less than 7 feet; in some cases, less than 6 feet; in some cases, less than 5 feet 6 inches; in some cases, less than 5 feet. However, because the vehicle may be designed to allow recipients to easily access the delivered items without the need for special equipment, the height should not be too low. In some embodiments, the main body of the unmanned vehicle has a height of greater than 4 feet; in some cases, greater than 5 feet.

Low Center of Gravity

The vehicle can be made to have a relatively lower center of gravity (CoG) height. This feature can be useful for a variety of reasons, including improving vehicle stability while traveling or resisting tipping-over by vandals. In some embodiments, the vehicle (unloaded and empty of fuel, if any required) has a CoG height of lower than 25 inches from the ground; in some cases, lower than 24 inches; in some cases, lower than 23 inches; in some cases, lower than 22 inches; in some cases, lower than 21 inches; in some cases, lower than 20 inches; in some cases, lower than 19 inches; in some cases, lower than 18 inches; in some cases, lower than 17 inches; in some cases, lower than 16 inches from the ground.

The CoG height can be lowered by placement of batteries, electric drive motors, and other equipment closer to the ground level, or reducing the height of the vehicle. As such, in some embodiments, any batteries and/or electric drive motors of the vehicle are positioned beneath a cargo compartment or located at a level beneath a cargo compartment of the vehicle.

Road Operating Equipment

The unmanned vehicle also has equipment for operating on roadways. For example, the unmanned vehicle may have a signal light (e.g. turn signal light); brake light (on the rear); forward facing light (e.g. headlights or beam lights) for illumination when operating during nighttime or reduced visibility conditions; exterior light (e.g. navigation light, emergency light, hazard light, strobe light, flashing light, spinning light, etc.) and/or reflector to enhance the conspicuousness of the unmanned vehicle to others; illuminated license plate; etc. The unmanned vehicle may also be covered under liability insurance for personal injury and/or property damage.

Cargo Compartment

The unmanned vehicle has one or more compartments for holding delivery cargo. The compartments may be closed/locked and be opened/unlocked in a secure manner. For example, the compartments may be opened/unlocked remotely by the operations hub upon request by the recipient. In another example, the recipient may be given an access code (e.g. via a smartphone) and the vehicle has an external keypad for entering the access code. Entry of the correct access code will open/unlock the compartment. In another example, the compartments may be unlocked/opened by the recipient's personal electronic device such as a smartphone.

In some embodiments, one or more of the compartments are designed for holding cold food items. For example, such cold compartments could be thermally-insulated (specifically designed for thermal insulation) and/or cooled. Temperature cooling can be provided in any suitable manner. For example, cooling could be provided by using refrigerant materials such as water ice, dry ice, or reusable cold packs (e.g. gel bags or bricks). In another example, cooling could be provided by electrical refrigeration.

In some embodiments, the vehicle has multiple separate cargo compartments that are individually accessible and/or lockable. This can allow the vehicle to make multiple deliveries to different recipients. For example, the vehicle can travel to one destination and deliver an item contained in one compartment, and then travel to another destination and deliver another item contained in a different compartment.

The cargo compartment may also have lighting to enhance visibility for the user, which may be particularly useful for nighttime deliveries. The lighting may be activated by opening of the compartment door. The vehicle may also have a camera for monitoring inside the compartment(s). This can be useful for preventing theft or monitoring the security of the contents.

For safety reasons, access to the cargo compartment (e.g. cargo door) may be located away from the side facing the street. For example, the cargo compartment access may be located only on the right side (with respect to the forward direction), top side, front side, and/or back side of the vehicle. In some cases, access to the cargo compartment is not located on the left side of the vehicle.

Vehicle Power Source

The unmanned vehicle may be propelled by any suitable power source, including conventional power sources such as gasoline or diesel, or alternative power sources such as battery-electric, natural gas, fuel cell, hybrid-electric, etc., or any combination thereof. Because the unmanned vehicle may be making mostly short trips, the unmanned vehicle may be powered by range-limited power sources, such as by electricity accumulator apparatus (e.g. batteries or capacitors). In some cases, the vehicle may be hybrid-powered, i.e. electrically-powered in combination with a fuel engine.

In some cases, such electrically-powered vehicles may not have (omit) any apparatus for generating electricity from fuel (e.g. fuel cell or gasoline-powered generator). For example, the unmanned vehicle may draw all its motive power from electricity accumulators only (e.g. battery-only) and has no other source of motive power or electricity generation.

The vehicle is propelled by one or more motors, which can be electric or fuel powered. Because the unmanned vehicle does not carry passengers and because it may be designed to be relatively lighter and relatively slower, the motor power of the vehicle may be relatively weaker compared to passenger cars. In this regard, the following embodiments are possible.

In embodiments where the vehicle is propelled by electric motor(s) only and if the vehicle has only a single electric motor, in some cases, the rated maximum horsepower of the electric motor may be less than 90 hp; and in some cases, less than 75 hp; and in some cases, less than 60 hp. However, because the vehicle is designed for traveling on conventional roadways, the vehicle should have sufficient power to maintain a speed that keeps pace with traffic. As such, the rated maximum horsepower of the electric motor may be greater than 25 hp; and in some cases, greater than 35 hp.

In embodiments where the vehicle is propelled by electric motor(s) only and if the vehicle has multiple electric motors (e.g. one on each of the front wheels), in some cases, the rated maximum horsepower of each electric motor may be less than 75 hp; and in some cases, less than 60 hp; and in some cases, less than 45 hp. However, because the vehicle is designed for traveling on conventional roadways, the vehicle should have sufficient power to maintain a speed that keeps pace with traffic. As such, the rated maximum horsepower of each electric motor may be greater than 15 hp; and in some cases, greater than 20 hp.

In embodiments where the vehicle is propelled by a combination of an internal combustion motor and electric motor(s) (i.e. a hybrid-powered vehicle) and if the vehicle has only a single electric motor, in some cases, the rated maximum horsepower of the electric motor may be less than 60 hp; and in some cases, less than 45 hp; and in some cases, less than 30 hp.

In embodiments where the vehicle is propelled by a combination of an internal combustion motor and electric motor(s) (i.e. a hybrid-powered vehicle) and if the vehicle has multiple electric motors, in some cases, the rated maximum horsepower of each electric motor may be less than 45 hp; and in some cases, less than 30 hp; and in some cases, less than 20 hp.

In embodiments where the vehicle is propelled by an internal combustion motor (exclusively or in conjunction with an electric motor), a relatively smaller motor may be used as compared to passenger cars. In some cases, the internal combustion motor has only three cylinders, in some cases only two cylinders, in some cases only a single cylinder. The relatively smaller motor can also be characterized by its displacement volume. In some cases, the displacement volume of the internal combustion motor may be less than 900 cc; in some cases, less than 750 cc; in some cases, less than 600 cc.

Unmanned Operation

Not having a human operator on board, the unmanned vehicle is able to operate on roadways in ordinary conditions without any human control, i.e. autonomously. The unmanned vehicle operates fully autonomously or partly autonomously, i.e. under a combination of human and autonomous control. For example, although the vehicle may be fully capable of driving autonomously, this autonomous control may be supplemented by human control via remote-operation on a as-needed basis, such as for vehicle breakdown, changes in traffic patterns, road construction, road or lane closures, detours, traffic accidents, severe weather conditions, or some other unexpected disruption to roadway traveling conditions. Thus, any reference made herein about the unmanned vehicle traveling to various places means that the vehicle is driven at least partly in an autonomous manner.

The unmanned vehicle is designed to carry cargo but not human passengers. Because the unmanned vehicle is not designed for onboard human presence, the vehicle may not have one or more of the following: seats for passengers, windows, seatbelts, airbags, climate control (e.g. heating or air conditioning), audio entertainment system, passenger doors, etc.

Because the autonomous vehicle is designed to operate without a human driver inside the vehicle, the vehicle may not have (omit) one or more of the following: steering wheel, gear lever or selector, accelerator pedal, foot brake, speedometer, side view mirror, rear view mirror, glass windshield, windshield wiper, etc.

Example Vehicle

FIGS. 1A-1C show an example of the unmanned ground vehicle of our invention. A flashing light beacon 30 is mounted on the roof of the main body 10. A perception apparatus 20 (here, a lidar apparatus) is mounted on top of the light beacon 30. The vehicle has a cargo compartment which can be accessed by opening the cargo door 12 (having hinges 15 and door handle 14). To unlock the cargo door 12, the customer enters the correct access code into the keypad 42. To improve visibility and safety, the vehicle also has a reflector stripe 16 and rear brake lights 44. The vehicle is also equipped with an audio loudspeaker 40 so that someone in the operations hub can speak with the delivery customer or bystanders.

Uses of the Autonomous Unmanned Road Vehicle

The autonomous unmanned road vehicle of our invention can be used in a variety of ways for making deliveries. The delivery destinations can be designated in any suitable manner to identify its location, such as GPS (global positioning system) coordinates, cellular network, and/or postal address as recognized by the postal service, emergency services (fire, ambulance, etc.), mapping agencies or firms, or courier services, etc. For example, a delivery destination may be designated as 1250 Main Street, Anytown, MA 90210 (fictitious address). The delivery destinations can be specified in even more detail (e.g. a specific side of a corner or a specific side of a building). Non-limiting examples of delivery destinations include residences and businesses, such as restaurants, offices, retail stores, etc.

The delivery is received by the recipient or customer, or someone on their behalf, such as a family member, friend, roommate, doorman, receptionist, etc. Because the items may be delivered without assistance, in some embodiments, the weight of each single item (e.g. a parcel) or bundled item (e.g. a shopping bag or box filled with grocery items), which is intended to be carried as a unit, may be relatively light such that they can be lifted or picked-up without assistance. In some cases, each single or bundled item being delivered weighs less than 90 lbs; in some cases, less than 75 lbs; in some cases, less than 50 lbs; in some cases, less than 25 lbs; in some cases, less than 20 lbs.

A. Delivery of Packages

In one embodiment, the unmanned vehicle can be used for delivering packages (e.g. boxes, parcels, envelopes, shipments, mail items, letters, etc.) that are destined for multiple (two or more) delivery destinations. This can be useful in situations where the recipient is not present at the delivery destination when the delivery is ready to be made. As such, the recipient can request delivery upon demand. Our invention can be particularly useful in making deliveries to residences (i.e. the delivery destinations are peoples' homes). For example, the recipient may not be able to receive their package until they return home from work, but can request delivery after they arrive home from work. The residences may be located in an area that is zoned for residential use.

Because the packages may be delivered to the recipient without assistance, in some embodiments, the packages for delivery may be limited to those that are relatively lighter such that they can be lifted or picked-up without assistance. In some cases, each of the packages are less than 90 lbs in weight; in some cases, less than 75 lbs in weight; in some cases, less than 50 lbs in weight.

Distribution Facility

At a distribution facility, one or more packages for delivery are loaded onto the unmanned vehicle. The distribution facility can be any facility that provides a place to receive packages and load them onto the unmanned vehicle. Non-limiting examples of distribution facilities include warehouses, distribution centers, sorting facilities, loading facilities, processing facilities, transportation facilities, etc. Other examples of distribution facilities that can be used by our invention are further described below. The distribution facility may further be involved in receiving, sorting, storing, and/or processing packages. The distribution facility may be combined or integrated with an operations hub. The distribution facilities referred to herein can be part of a larger distribution network.

Regional and Local Distribution Facilities

In certain embodiments, our invention uses one or more regional distribution facilities that each distribute packages to multiple (two or more) local distribution facilities, each of which serves a delivery zone with multiple delivery destinations. At a regional distribution facility, the packages are loaded onto a transport vehicle for delivery to a local distribution facility. The vehicle used in this transport phase may be any conventional ground vehicle and does not have to be an unmanned vehicle. The transport vehicle then travels to the local distribution facility, which is responsible for delivering the packages to their delivery destinations. At the local distribution facility, the transport vehicle may wait without unloading or unload the packages destined for the delivery destinations served by the local distribution facility.

The local distribution facility is connected to the delivery destinations via paved roadways. To provide timely on-demand delivery, the local distribution facility is generally located close to the delivery destinations. In some embodiments, all the delivery destinations served by the local distribution facility are within a 10 mile radius of the local distribution facility; in some cases, within a 6 mile radius; in some cases, within a 3 mile radius. In some embodiments, at least 85% of the delivery destinations served by the local distribution facility are within a 10 mile radius of the local distribution facility; in some cases, within a 6 mile radius; in some cases, within a 3 mile radius.

In some cases, the local distribution facility is dedicated solely for the delivery service. But in other cases, the local distribution facility may be located at a business facility that operates a different type of business (other than the delivery service), such as a retail store, office building, gas station, parking garage or parking lot, or school. For example, the delivery service may be operated out of a back room, on the parking lot, or from the back alley of the business facility. Examples of retail stores where the local distribution facility could be located include grocery store, supermarket, warehouse store, department store, convenience store, variety store, drug or pharmacy store, electronics store, restaurant, office supply store, hardware or building supply store, etc.

This is a useful feature because many retail stores already exist in close proximity to residential areas (e.g. neighborhood grocery stores).

In some embodiments, the local distribution facility is located at an already-established business facility that has been modified to also operate the delivery service but continues to operate the already-existing business (e.g. by remodeling, renovation, or other modification of the premises such that it can continue the already-operating business). For example, a back room or area of a retail store (e.g. grocery store or convenience store) could be converted or renovated to operate the delivery service. In another example, the parking lot of a shopping center could be equipped to hold and maintain a fleet of unmanned vehicles, along with other equipment, personnel, and/or housing to operate the delivery service.

In cases where the local distribution facility is located at a business facility that also operates a different type of business, there may be some employee staff who are dedicated to the delivery service (e.g. maintaining or operating the vehicles). However, it may also be possible to have employee(s) who work both the other business operations and also the delivery service. As such, in some cases, the business facility operates with at least one employee in at least one work shift working in both the other business operation and the delivery service; and in some cases, at least three employees in at least one work shift who work in this manner.

In some embodiments, the local distribution facility is located in an area that is zoned for commercial, industrial, and/or mixed residential-commercial use. In some embodiments, there is a residential area or an area that is zoned for residential use located within a 6 mile radius of the local distribution facility; in some cases, within a 3 mile radius. This can be a useful feature because many deliveries may be made to residences. In some cases, the local distribution facility has a covered garage for storing the vehicle(s) when not in use (e.g. during idle time or overnight).

Because the regional distribution facility does not necessarily provide on-demand delivery, it can generally be located farther away from the delivery destinations served by the local distribution facility. In some embodiments, all the delivery destinations served by the local distribution facility are outside a 1 mile radius of the regional distribution facility; in some cases, outside a 3 mile radius; in some cases, outside a 6 mile radius. In some embodiments, at least 85% of the delivery destinations served by the local distribution facility are outside a 1 mile radius of the regional distribution facility; in some cases, outside a 3 mile radius; in some cases, outside a 6 mile radius. These statistical parameters may be applicable to a particular regional distribution facility, a particular local distribution facility, or system-wide. That is, infringement of our patent may occur at the level of the particular regional distribution facility, local distribution facility, or system-wide.

The recipients are notified that their packages are ready for delivery. This notification may occur at any suitable time point, such as after the packages arrive at the local distribution facility. This notification to the recipients may be performed by the operations hub. After receiving this notification, a recipient can request delivery of their package(s) (e.g. by replying back to the ready notification). This delivery request is received at the local distribution facility (e.g. via the operations hub) and the requested package(s) is loaded onto an unmanned ground vehicle. If multiple delivery requests are received, the packages for the multiple requests may be loaded.

The unmanned vehicle is then sent to the recipient's delivery destination. The unmanned ground vehicle travels, being driven at least partly in an autonomous manner, to the recipient's delivery destination via a paved roadway. To confirm the recipient's request, the recipient may be notified (e.g. by the operations hub) that the requested package(s) is on its way. This notification may occur at any suitable time point, such as when the package(s) is loaded onto the unmanned vehicle or when the vehicle is in transit to the delivery destination.

Because the unmanned vehicle is expected to make deliveries through multiple round trips as demanded, for each excursion from the local distribution facility, the vehicle carries less than the total number of packages to be delivered for all the delivery destinations being served by that local distribution facility. For example, considering a hypothetical situation in which the local distribution facility has to deliver a total of 28 packages for delivery to 25 delivery destinations, the vehicle may end up making 20 round trips to make these deliveries, and for each round trip, carry the package(s) for only one or two delivery destinations. In some embodiments, for each excursion from the local distribution facility to make a delivery(s), the vehicle visits only two delivery destinations or fewer before returning back to the local distribution facility; in some cases, visits only three delivery destinations or fewer; in some cases, visits only four delivery destinations or fewer.

Figure 6:
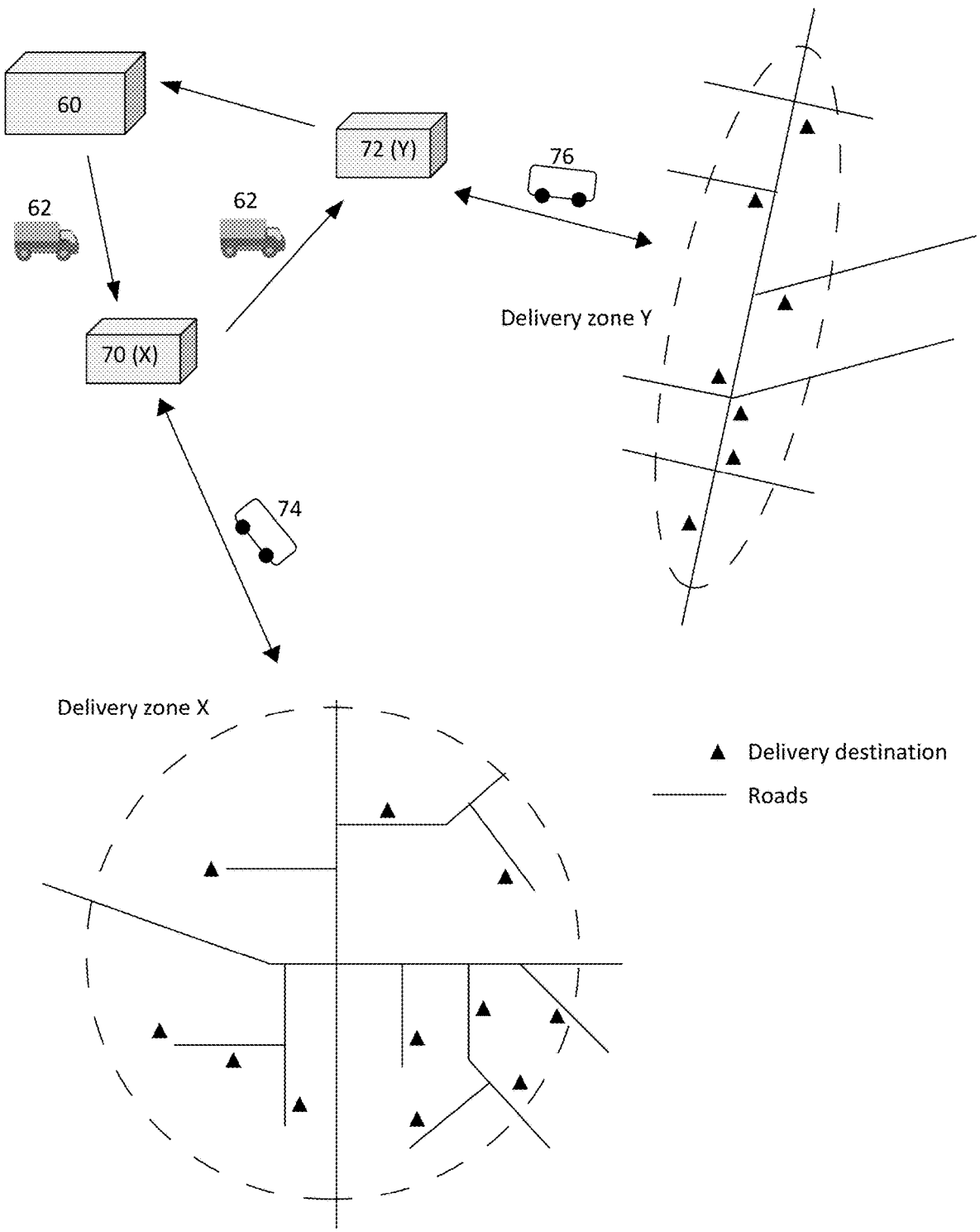
FIG. 6 shows an example of how an autonomous unmanned road vehicle can be used to make deliveries from a distribution facility.

FIG. 6 shows an example of how the our invention can be implemented. At a regional distribution facility 60, a conventional delivery truck 62 is loaded with packages that are destined for multiple residential delivery destinations (A). After loading, the truck 62 travels to local distribution facility 70. Here, the packages destined for delivery zone X are unloaded. All the delivery destinations in delivery zone X are within a 6 mile radius of the local distribution facility 70. After unloading the packages at local distribution facility 70, the truck 62 then travels to local distribution facility 72 to drop-off their packages.

The operations hub notifies the package recipients that their packages are ready for delivery to their delivery destinations. When a recipient in delivery zone X requests a delivery (e.g. upon returning home from work), the recipient's package(s) is loaded into an unmanned ground vehicle 74 at local distribution facility 70. On command, the unmanned vehicle 74 then travels to the recipient's delivery destination in delivery zone X. In transit, the operations hub notifies the recipient that the package is on its way. When the unmanned delivery vehicle 74 arrives at the delivery destination, the operations hub notifies the recipient that the package has arrived and provides an access code for opening the cargo compartment of the unmanned delivery vehicle.

When the recipient enters the correct access code (e.g. on an external keypad on the unmanned vehicle), the cargo door is unlocked. The recipient picks-up the package and closes the cargo door. The recipient presses a button on the unmanned vehicle indicating that the package delivery is completed. With this, the unmanned vehicle 74 makes another delivery or returns to the local distribution facility 70. Delivery to a recipient in delivery zone Y can be made in the same manner, using an unmanned ground vehicle 76 sent from local distribution facility 72.

Waiting Areas

In certain embodiments, our invention uses a waiting area where the unmanned vehicle can park while it awaits its next delivery request (e.g. in between deliveries). At a base distribution facility (e.g. a local distribution facility), the unmanned ground vehicle is loaded with multiple packages to be delivered to multiple delivery destinations. With the packages loaded, the unmanned vehicle leaves the base distribution facility and drives, at least partly in an autonomous manner, to the waiting area (although it may first make a delivery(s) before arriving at the waiting area). The unmanned vehicle parks at the waiting area and awaits a command to make the next delivery.

The waiting area is a location that is a short distance away from the delivery destinations so that deliveries can be made on-demand. In some embodiments, all the delivery destinations being served by the unmanned vehicle are within a 10 mile radius of the waiting area; in some cases, within a 6 mile radius; in some cases, within a 3 mile radius. In some embodiments, at least 85% of the delivery destinations being served by the unmanned vehicle are within a 10 mile radius of the waiting area; in some cases, within a 6 mile radius; in some cases, within a 3 mile radius. These statistical parameters may be applicable to a particular base facility or system-wide. That is, infringement of our patent may occur at the level of the particular base facility or system-wide.

Any suitable location where the unmanned vehicle can temporarily park can serve as the waiting area. In some embodiments, the waiting area can be an on-street parking site (e.g. curbside parking) and/or an off-street parking site such as a parking structure, surface parking lot, or even a residential garage or driveway (with the owner's authorization). In some embodiments, the waiting area is located at a business facility that operates a different type of business (other than the delivery service) as explained above, such as a retail store. For example, the waiting area can be in the parking lot of a grocery store.

In cases where the waiting area is located at a business facility, there may be some employee staff who are dedicated to the delivery service (e.g. maintaining or operating the vehicles). However, it may also be possible to have employee(s) who work both the other business operations and also the delivery service. As such, in some cases, the business facility operates with at least one employee in at least one work shift working in both the other business operation and the delivery service; and in some cases, at least three employees in at least one work shift who work in this manner.

In some embodiments, the waiting area has equipment and/or personnel for maintaining the unmanned vehicle (e.g. recharging equipment, refueling equipment, repair equipment, tow truck or recovery truck, security guards to guard over the vehicles, repair personnel, etc.). In some embodiments, the waiting area is located in an area that is zoned for commercial, industrial, and/or mixed residential-commercial use.

There may be more than one waiting area available for serving the delivery destinations. For example, after making a delivery, the closest of several predetermined waiting areas may be selected. But the waiting area(s) does not necessarily have to be pre-determined. For example, a waiting area may be found on an ad hoc basis (e.g. if the usual waiting area is not available). In another example, after making a delivery, that delivery destination or somewhere close may be made as the current waiting area.

The recipients are notified that their packages are ready for delivery. This notification may occur at any suitable time point, such as after the packages are loaded onto the unmanned delivery vehicle or when the unmanned vehicle arrives at the waiting area. This notification to the recipients may be performed by the operations hub. After receiving this notification, a recipient can request delivery of the package(s) (e.g. by replying back to the ready notification).

The operations hub sends a command to the unmanned vehicle to make the requested delivery. The unmanned ground vehicle then travels, being driven at least partly in an autonomous manner, to the recipient's delivery destination via a paved roadway. To confirm the recipient's request, the recipient may be notified (e.g. by the operations hub) that the requested package(s) is on its way. This notification may occur at any suitable time point, such as when the vehicle is in transit to the delivery destination.

Figure 7:
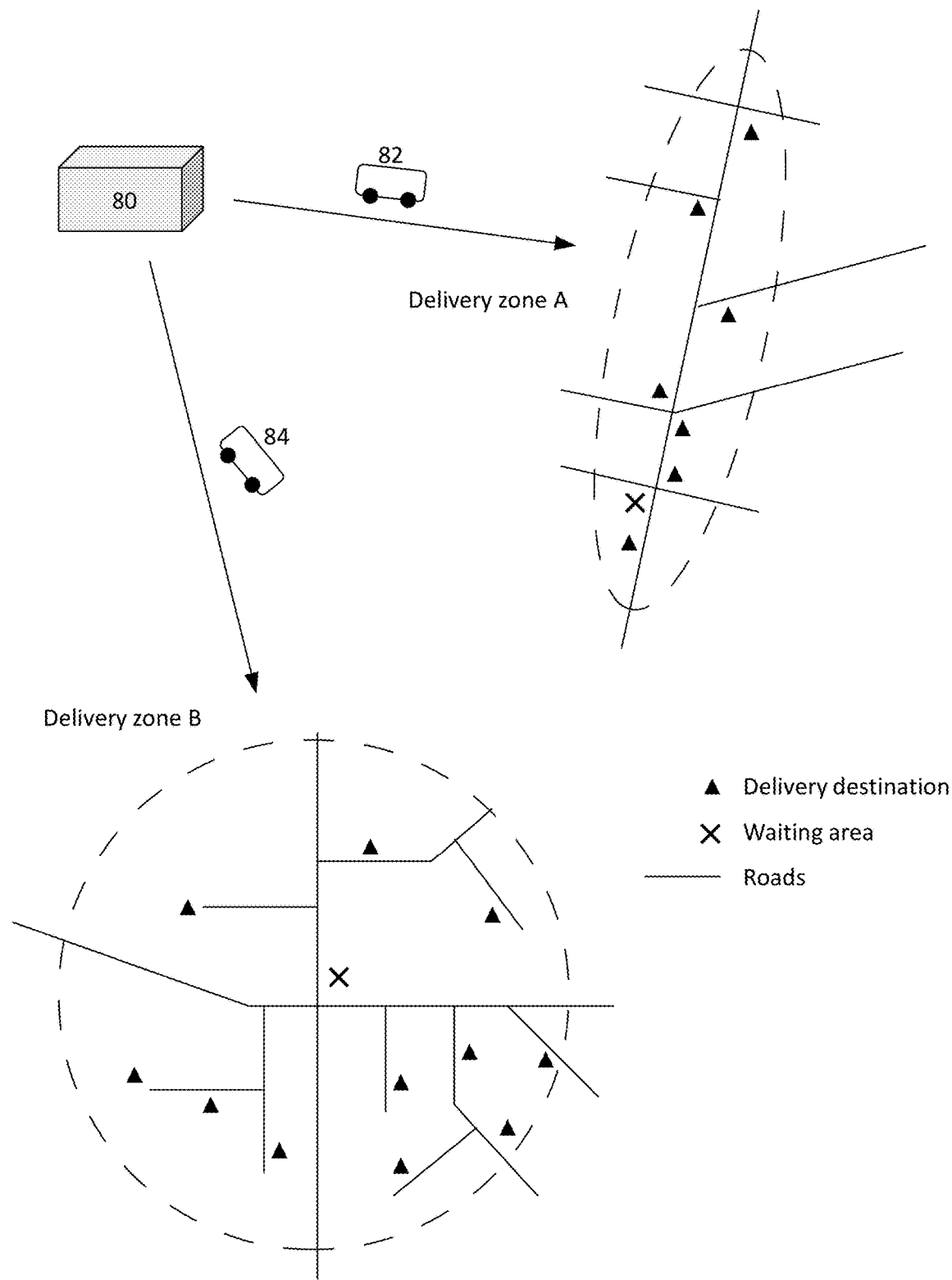
FIG. 7 shows another example of how an autonomous unmanned road vehicle can be used to make deliveries from a distribution facility and waiting area.

FIG. 7 shows another example of how the our invention can be implemented. At a base distribution facility 80, unmanned ground vehicles 82 and 84 are loaded with packages that are destined for multiple residential delivery destinations (A) within their assigned delivery zones A and B. After loading, the unmanned vehicles are sent on their way to their respective delivery zones A and B. Each vehicle travels to its respective waiting area (X) and parks there, awaiting a command to make a delivery. Alternatively, the vehicle may make a delivery(s) before traveling to the waiting area. All the delivery destinations being served by the unmanned vehicle for that particular excursion are within a 6 mile radius of the waiting area (X).

Although FIG. 7 shows the waiting area being within the delivery zone, this does not have to be the case. For example, the delivery zone may be a residential area, but the waiting area may be located in a commercial zone that is adjacent to the residential area.

In transit, the operations hub notifies the package recipients that their packages are ready for delivery to their delivery destinations. When a recipient in delivery zone A requests a delivery (e.g. upon returning home from work), the operations hub sends a command to the unmanned vehicle 82 for delivery zone A to make that delivery. The unmanned vehicle 82 departs from the waiting area and travels to the delivery destination. In transit to the recipient's delivery destination, the operations hub notifies the recipient that the package is on its way. When the unmanned delivery vehicle 82 arrives at the delivery destination, the operations hub notifies the recipient that the package has arrived and provides an access code for opening the cargo compartment of the unmanned delivery vehicle.

When the recipient enters the correct access code (e.g. on an external keypad on the unmanned vehicle), the cargo door is unlocked. The recipient picks-up the package and closes the cargo door. The recipient presses a button on the unmanned vehicle indicating that the package delivery is completed. With this, the unmanned vehicle 82 makes another delivery or returns to the waiting area. Delivery to a recipient in delivery zone B can be made in the same manner using unmanned ground vehicle 84.

General Embodiment

In certain embodiments, our invention may be considered more generally as a method of transporting packages that are destined for multiple delivery destinations using an unmanned ground vehicle. The packages are transported from a first location to a second (intermediate) location. Examples of first locations include regional distribution facilities and base distribution facilities as described above (e.g. a local distribution facility); examples of intermediate locations include local distribution facilities and waiting areas as described above. (Note that a local distribution facility can be considered a first location or an intermediate location, depending upon the overall configuration of the delivery network.) The intermediate location is connected with the delivery destinations via paved roadways.

In some embodiments, all the delivery destinations are within a 10 mile radius of the intermediate location; in some cases, within a 6 mile radius; in some cases, within a 3 mile radius. In some embodiments, at least 85% of the delivery destinations are within a 10 mile radius of the intermediate location; in some cases, within a 6 mile radius; in some cases, within a 3 mile radius. These statistical parameters may be applicable to a particular first location, particular intermediate location, or system-wide. That is, infringement of our patent may occur at the level of the particular first location, particular intermediate location, or system-wide.

In some embodiments, all the delivery destinations are outside a 1 mile radius of the first location; in some cases, outside a 3 mile radius; in some cases, outside a 6 mile radius. In some embodiments, at least 85% of the delivery destinations are outside a 1 mile radius of the first location; in some cases, outside a 3 mile radius; in some cases, outside a 6 mile radius. These statistical parameters may be applicable to a particular first location or system-wide. That is, infringement of our patent may occur at the level of the particular first location or system-wide.

The method comprises notifying the recipients that their packages are ready for delivery. After receiving this notification, a recipient may communicate a request notification requesting delivery of their package to the delivery destination. In response to the delivery request, an unmanned ground vehicle that is loaded with the package(s) is sent from an intermediate location to the recipient's delivery destination on a paved roadway. The unmanned ground vehicle travels, being driven at least partly in an autonomous manner, to the recipient's delivery destination via a paved roadway.

The recipient is notified that their package has arrived or will be arriving. After making the delivery, the unmanned ground vehicle makes another delivery or is driven, at least partly in an autonomous manner, on a paved roadway back to the intermediate location.

Delivery Performance

Because the second (intermediate) location is located close to the recipient's delivery destination, our invention can provide on-demand delivery in a timely manner. In some embodiments, greater than 50% of the deliveries arrive at the recipient's delivery destination within 45 minutes of the delivery request; and in some cases, greater than 75% (as applied to a particular first location and/or system-wide).

Whereas in conventional delivery methods the recipient often must accommodate to the delivery schedule, our delivery method allows the deliveries to be made at a time convenient for the recipient. For example, many working people are not at home during the workday. Our invention can offer the convenience of receiving a package during after-work hours. While at work, the recipient may receive a notification that a package has arrived and is ready for delivery. When the recipient returns home, they can request delivery of the package to their home. As such, in some embodiments, at least 50% of the weekday deliveries to residences are made between the hours of 3 μm to 11 pm (as applied to a particular first location and/or system-wide); in some cases, at least 70% of the weekday deliveries as aforementioned.

B. Delivery of Retail Goods

In this embodiment, our invention provides another method of delivering retail goods to customers using an unmanned ground vehicle. A variety of different types of retail goods can be delivered using our method. For example, the retail goods may be food products (e.g. groceries or prepared meals); consumables (e.g. baby care, medicines, personal care products, health care products, beauty care products, household products, cleaning supplies, clothing/apparel, etc.); and/or durable goods (e.g. electronics, appliances, hardware supplies, etc.). Such retail goods may be found in retail stores such as grocery stores, supermarkets, hypermarkets, warehouse stores, department stores, convenience stores, variety stores, drug or pharmacy stores, electronics stores, restaurants, etc.

Purchase Order

A purchase order is received from a customer. The purchase order includes one or more purchased items to be delivered to the customer at a designated delivery destination. The customer can make the purchase order in any suitable manner, such using a wired or wireless communication devices (e.g. mobile phones), desktop computers, home control panel (for a home automation system), etc. The purchase order can be made through any suitable type of interface, such as website with a browser, specialized programs (e.g. smartphone apps), telephone menu, an automated home inventory system, etc. For example, the purchase order can be placed through the Internet using a smartphone.

Local Retail Facility

The purchase order is received by and/or transmitted to a local retail facility that serves end-user/consumer customers, i.e. stocks products that are packaged in a manner intended for the end-user/consumer. The local retail facility is connected to the customer's delivery destination via paved roadways. To provide timely on-demand delivery, the local retail facility is generally located close to the customer's delivery destination. In some embodiments, the local retail facility is located within a 10 mile radius of the customer's delivery destination; in some cases, within a 6 mile radius; in some cases, within a 3 mile radius. In some embodiments, there is a residential area or an area that is zoned for residential use located within a 6 mile radius of the local retail facility; in some cases, within a 3 mile radius. This can be a useful feature because many deliveries may be made to residences.

Delivery Packaging

At the local retail facility, the item(s) in the customer's purchase order are collected and placed into one or more delivery packaging that are designated for that customer's purchase order. The delivery packaging may be disposable or reusable, and may take any suitable form such as paper or plastic bags, cardboard boxes, cartons, plastic containers, etc. There may be delivery packaging of different types, shapes, sizes, etc., to accommodate different types of merchandise or different quantities of merchandise. For example, non-perishable goods may be put into disposable paper bags and perishable food products may be put into reusable insulated plastic containers. Depending upon the type and quantity of merchandise in the purchase order, the purchased items may be held in multiple delivery packaging. Different packaging may used together. For example, multiple paper bags may be put into a larger plastic container. Some purchased items may be too large or bulky to place into a delivery packaging. Such items may be held as loose items while waiting to be loaded onto the delivery vehicle.

Because the purchased items may be delivered without assistance, in some embodiments, the total weight of each packaging holding the purchased item(s) may be relatively light such that they can be lifted or picked-up without assistance. In some cases, each of the loaded delivery packaging weighs less than 50 lbs; in some cases, less than 25 lbs; in some cases, less than 20 lbs.

The customer's purchase order may include cold food products (e.g. cooled, refrigerated, frozen, or perishable), such as produce, frozen foods, milk, fruit juices, meats, cheese, dairy, eggs, etc. To maintain freshness while waiting to be loaded onto the delivery vehicle, packaging holding cold food items could be stored in a cooled space at the local retail facility, such as a refrigerator or freezer. For example, they could be stored in a large commercial refrigerator or a refrigerated room such as a walk-in cooler, refrigerator, or freezer. Alternatively or in combination, cold food items could be placed into special delivery containers that are thermally-insulated (specifically designed for thermal insulation) and/or cooled. Temperature cooling can be provided in any suitable manner. For example, cooling could be provided by using refrigerant materials such as water ice, dry ice, or reusable cold packs (e.g. gel bags or bricks). In another example, cooling could be provided by electrical refrigeration.

Walk-In Retail Store

In some cases, the local retail facility is specialized solely for delivery service of the retail goods (similar to a warehouse). But in other cases, the local retail facility may operate as both a conventional walk-in retail store and a delivery service. Examples of walk-in retail stores include grocery stores, supermarkets, hypermarkets, warehouse stores, department stores, convenience stores, variety stores, drug or pharmacy stores, electronics stores, restaurants, office supply store, hardware or building supply store, etc. For example, the delivery service may be operated out of one or more back rooms or areas of the walk-in retail store. The inventory of merchandise for the walk-in retail store may also be used to supply the delivery service.

In some cases, the local retail facility is an already-established conventional walk-in retail store that has been modified to also operate the delivery service but continues to operate the already-existing business (e.g. by remodeling, renovation, or other modification of the premises such that it can continue the already-operating business). For example, one or more back rooms or areas of the walk-in retail store could be converted or renovated to operate the delivery service. This is a useful feature because many retail stores already exist in close proximity to residential areas (e.g. neighborhood grocery stores).

In cases where the local retail facility operates as both a conventional walk-in retail store and a delivery service, there may be some employee staff who are dedicated to the delivery service (e.g. maintaining or operating the vehicles). However, it may also be possible to have employee(s) who work both the walk-in retail store and also the delivery service. As such, in some cases, the local retail facility operates with at least one employee in at least one work shift working in both the walk-in retail store and the delivery service; and in some cases, at least three employees in at least one work shift who work in this manner.

Delivery

The customer is notified when their purchase order is ready for delivery. The purchase order is ready for delivery and now awaits a delivery request from the customer. When the customer's delivery request is received, the package(s) containing the customer's purchase order are loaded into an unmanned ground vehicle. The unmanned ground vehicle is not the possession of the customer. Some other party, such as the local retail facility, has legal possession of the unmanned ground vehicle (e.g. owns, leases, or through other contractual arrangement).

In some cases, the local retail facility has a vehicle bay where the unmanned ground vehicle(s) is parked while being loaded. Because the unmanned vehicle may have a lower height than conventional delivery trucks, in some cases, the vehicle bay has a clearance height (e.g. ceiling height) of less than 15 feet; in some cases, less than 12 feet; in some cases, less than 10 feet of clearance height. In some cases, the local retail facility has a covered garage for storing the vehicle(s) when not in use (e.g. during idle time or overnight).

The unmanned vehicle is then sent to the customer's delivery destination. The unmanned vehicle travels, being driven at least partly in an autonomous manner, to the delivery destination via a paved roadway. To confirm the customer's delivery request, the customer may be notified (e.g. by the operations hub) that the delivery is on its way. This notification may occur at any suitable time point, such as when the goods are loaded onto the unmanned vehicle or when the vehicle is in transit to the delivery destination.

In some cases, one or more of the packaging used for making the delivery is reusable and intended to be returned to the local retail facility. For example, the container holding the cold food items may be designed for reuse. The recipient removes the container from the vehicle and unpacks it (e.g. move the cold food items into the refrigerator). During this time, the vehicle will stand-by until the container is returned to the vehicle.

Delivery Performance

Because the local retail facility is located close to the customer's delivery destination and the customer's purchase order is prepared before the delivery request, our invention can provide on-demand delivery in a timely manner. In some embodiments, greater than 50% of the purchase orders made by the customers arrive at the delivery destination within 45 minutes of the customers' delivery request; and in some cases, greater than 75% (as applied to a particular local retail facility and/or system-wide).

Whereas in conventional delivery methods the customer often must accommodate to the delivery schedule, our delivery method allows the deliveries to be made at a time convenient for the customer. For example, for many customers, receiving deliveries at home after work hours is more convenient. In some embodiments of our invention, greater than 50% of the weekday (Monday-Friday) deliveries are made in the hours of 3 μm to 11 μm; in some cases, greater than 70% (as applied to a particular local retail facility and/or system-wide).

Our method can provide same day delivery with high reliability. In some cases, greater than 75% of the purchase orders received between the hours of 7 am to 3 pm are delivered the same day; in some cases, greater than 90% of the purchase orders received between the hours of 7 am to 3 pm are delivered the same day (as applied to a particular local retail facility and/or system-wide). Because our method uses unmanned delivery vehicles, a high volume of deliveries can be made. In some cases, a local retail facility makes an average of 25 purchase order deliveries per day; in some cases, an average of 60 per day; in some cases, an average of 125 per day.

Our invention can be useful in situations where the customer will not be present at the delivery destination when the delivery is ready to be sent. For example, many working people are not at home during the workday. Our invention can offer the convenience of making a purchase order in the morning or afternoon hours (e.g. at their workplace). When they return home, they can request delivery of the purchased goods to their homes. As such, in some embodiments, at least 35% of the weekday purchase orders for delivery to residences are made between the hours of 7 am to 5 μm, and at least 50% of the weekday deliveries to residences (same day as purchase order) are made between the hours of 3 μm to 11 pm (as applied to a particular local retail facility and/or system-wide); in some cases, at least 50% of the weekday purchase orders and at least 70% of the weekday deliveries as aforementioned.

Our invention can offer the convenience of making a purchase order on the night prior for on-demand delivery the next day. As such, in some embodiments, at least 15% of the purchase orders for delivery to residences the next day are made between the overnight hours of 5 μm to 12 midnight (as applied to a particular local retail facility and/or system-wide); in some cases, at least 25% of the purchase orders as aforementioned.

Example Embodiment

Figure 8:
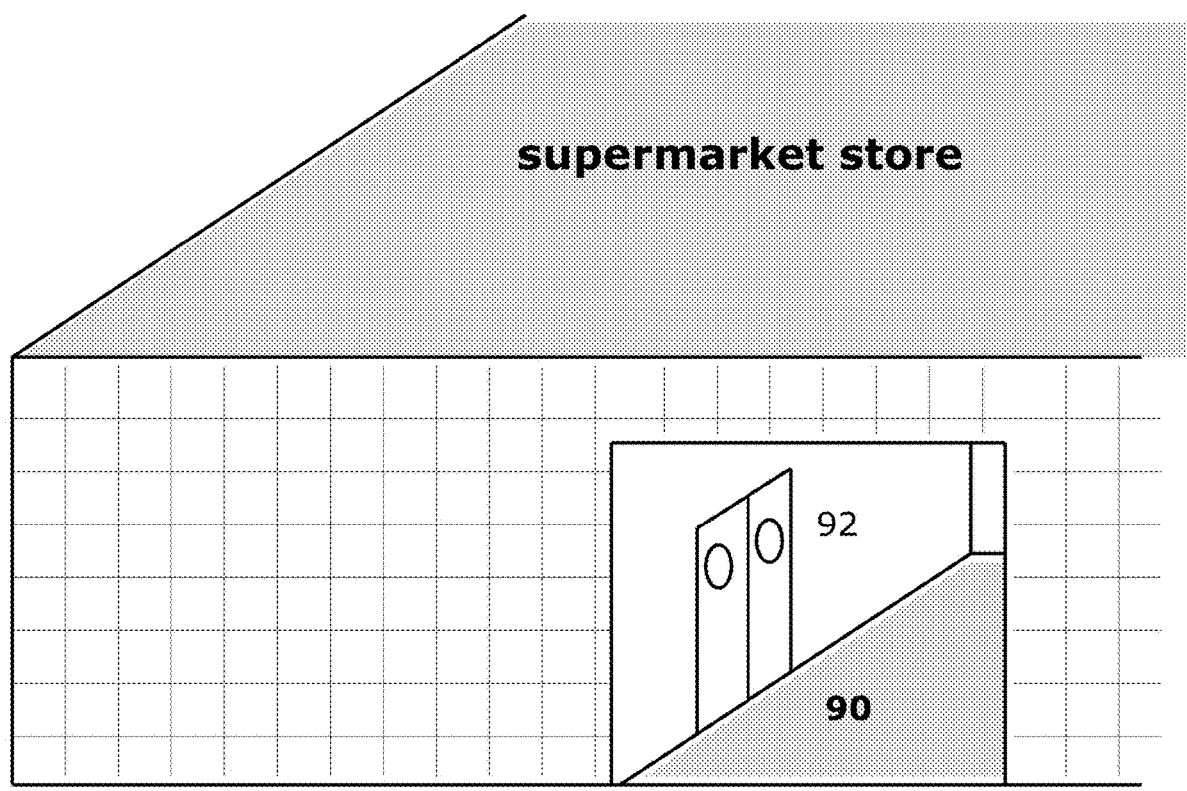
FIGS. 8-10 show an example of how an autonomous unmanned road vehicle can be used to make deliveries from a supermarket store.
Figure 9:
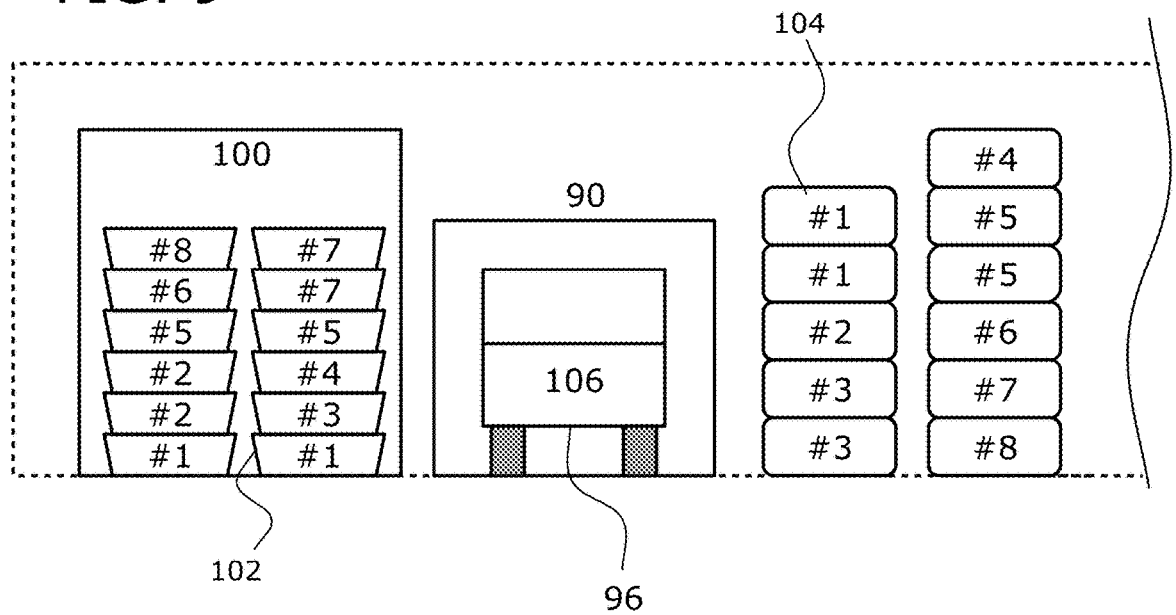
Figure 10:
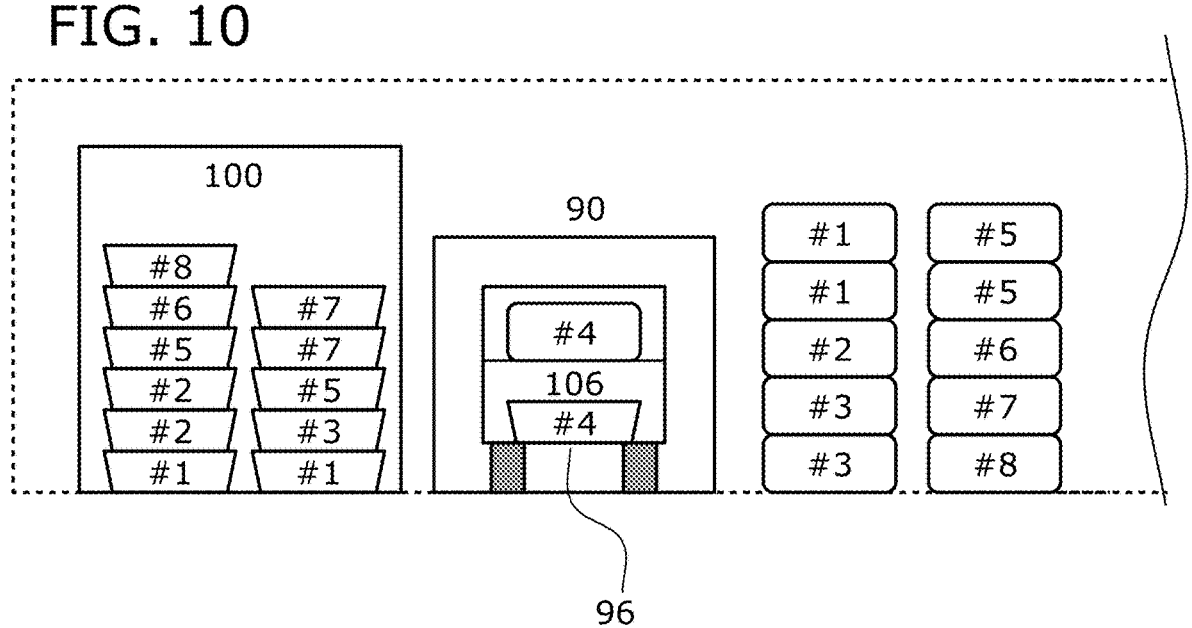

FIGS. 8-10 show an example of how our invention might be implemented. FIG. 8 shows the back of a supermarket store (perspective view). The front of the store is a conventional walk-in supermarket store. There is a vehicle bay 90 where the unmanned delivery vehicle can be parked. Employees load the delivery vehicle through the service doors 92.

FIG. 9 shows another view of the back of the supermarket (elevation view with see-through). Multiple customer purchase orders have been received. The employees have collected the purchased items and put them into delivery packaging (for customer order #1, #2, and so on). Some of the purchased items are cold food items. These are put into thermally-insulated plastic containers 102 and stored in a refrigerated room 100 (e.g. walk-in refrigerator). Non-perishable items are put into disposable cardboard boxes 104 and kept at ambient temperatures. The customers have been notified that their purchase orders are ready for delivery to the designated destinations. The unmanned delivery vehicle 96 is parked in the vehicle bay 90 awaiting a delivery request.

In FIG. 10, the customer for purchase order #4 has requested delivery to the customer's home. Store employees load purchase order #4 into the delivery vehicle 96. The insulated container for order #4 is loaded into the cold compartment 106 of the vehicle (bottom), which itself is thermally-insulated and electrically refrigerated. The cardboard boxes holding the non-perishable items are loaded into the top compartment (no temperature control). After loading, the delivery vehicle 96 is sent on its way to the customer's home.

In transit to the delivery destination, the customer is notified that the delivery is on its way. When the unmanned delivery vehicle 96 arrives at the delivery destination, the customer is notified that the delivery vehicle has arrived and is given an access code for opening the cargo compartment of the unmanned delivery vehicle. When the customer enters the correct access code (e.g. on an external keypad on the unmanned vehicle), the cargo door is unlocked. The customer picks-up the delivery packaging and takes them inside home. After unpacking the cold food items in the insulated container, the customer returns the insulated container into the cold compartment of the vehicle and closes the cargo door. The customer then presses a button on the unmanned vehicle indicating that the delivery is completed. With this, the unmanned vehicle returns to the supermarket or makes more deliveries.

C. Taxi Delivery Service

This embodiment of our invention contemplates the use of an autonomous unmanned road vehicle to transport items from a sender to a recipient. The sender makes a request for a delivery vehicle (like a request for a taxi) to pick-up an item for delivery to a recipient at a designated delivery location.

Home Base Facility

In this embodiment, the invention uses a home base facility that serves as a place where a fleet of unmanned ground vehicles is kept and maintained. The home base facility can be any suitable facility where the vehicles can be maintained, stored, house equipment or personnel involved in the delivery service, and/or house communication equipment for operating the delivery service, etc. The home base facility may have personnel and equipment for maintaining the unmanned vehicles, such as battery recharging equipment, replacement batteries, replacement parts, fuel and fueling equipment, repair tools and equipment, etc. The home base facility may also have a recovery truck (e.g. tow truck or carrier truck) to be dispatched to recover or repair an unmanned vehicle if it experiences problems (e.g. loss of battery power, breakdown, traffic collision, vandalism, etc.).

In some cases, the home base facility is dedicated solely for the taxi delivery service. But in other cases, the home base may be located at a business facility that operates a different type of business (other than the delivery service), such as a retail store, office building, gas station, parking garage or parking lot, or school. For example, the delivery service may be operated out of a back room, on the parking lot, or from the back alley of the business facility. Examples of retail stores where the home base facility could be located include grocery store, supermarket, warehouse store, department store, convenience store, variety store, drug or pharmacy store, electronics store, restaurant, office supply store, hardware or building supply store, etc. This is a useful feature because many retail stores already exist in close proximity to residential areas (e.g. neighborhood grocery stores).

The facility for the home base does not have to be newly constructed. In some embodiments, the home base is located at an already-established business facility that has been modified to also operate the delivery service but continues to operate the already-existing business (e.g. by remodeling, renovation, or other modification of the premises such that it can continue the already-operating business). For example, a back room or area of a retail store (e.g. grocery store or convenience store) could be converted or renovated to operate the delivery service. In another example, the parking lot of a shopping center could be equipped to hold and maintain a fleet of unmanned vehicles, along with other equipment, personnel, and/or housing to operate the delivery service.

In cases where the home base facility is located at a business facility that also operates a different type of business, there may be some employee staff who are dedicated to the delivery service (e.g. maintaining or operating the vehicles). However, it may also be possible to have employee(s) who work both the other business operations and also the delivery service. As such, in some cases, the business facility operates with at least one employee in at least one work shift working in both the other business operation and the delivery service; and in some cases, at least three employees in at least one work shift who work in this manner.

In some embodiments, the home base facility is located in an area that is zoned for commercial, industrial, and/or mixed residential-commercial use. In some embodiments, the home base facility is located within 6 miles from a residential area, or land that is zoned for residential use, or a residential building (e.g. condominium, apartment building, townhouse, rowhouse, detached single-family house, etc.). This is a useful feature because many requests may involve delivery to residences. In some cases, the home base facility has a covered garage for storing the vehicle(s) when not in use (e.g. during idle time or overnight).

Delivery Request

The sender makes a request for transporting one or more items from a location designated by the sender (which may be the sender's own location or another location) to a recipient's location, i.e. delivery destination. The delivery service of our invention receives the request and assigns one or more of the unmanned ground vehicles for the transportation job. The selected vehicle is one that is in relative close proximity to the sender's designated location to provide timely on-demand delivery service. Proximity to the sender's designated location may be determined based on any suitable parameter, such as straight-line distance, travel distance, and/or travel time. Estimates of proximity may vary depending upon various external factors such as road and traffic conditions, time of day, weather conditions, traffic signal patterns, number of turns required, availability of highways or expressways on the way, etc.

The selected vehicle may be idle or traveling. For example, the selected vehicle may be at the home base facility, parked at a temporary waiting area, or in transit (e.g. returning to home base, going to a temporary waiting area, finishing a delivery job, roaming, etc.).

The selected vehicle is one that is in relative close proximity to the sender's designated location to provide timely on-demand delivery. As such, in some embodiments, for greater than 60% of all accepted taxi requests made by senders, the selected vehicle arrives at the sender's designated location within 45 minutes of the sender's taxi request; in some cases, for greater than 75% of all accepted taxi requests. These statistical parameters may be applicable to a particular home base facility, particular regional network, and/or system-wide. That is, infringement of our patent may occur at the level of particular home base facility(s), particular region(s), or system-wide. Here, "all accepted requests" means not counting denied requests (such as prank calls) but encompassing the possibility of delaying incidents, whether expected or unexpected, such as traffic collision, vandalism, road closure, heavy traffic conditions, incorrect or non-existent sender location, inability to access the sender's location (e.g. gated community), etc.

In some embodiments, the sender is a business entity and the recipient is a customer (which may be another business entity or an individual). Many types of businesses may be able to use our invention for delivering items to customers, including retail businesses (as described above). Many types of items can be delivered using our invention, including consumer and commercial items. Examples of consumer items (i.e. products that are packaged in a manner intended for the end-user/consumer) that can be delivered include foods, groceries, medical supplies and drugs, propane gas, drinking water, postal packages, office supplies, household products, personal care products, electronic goods, baby care products, clothing/apparel, etc.

The sender does not have to be a business. Our invention can also be used by individuals for delivering personal items (e.g. for sending a gift package to a friend).

In some embodiments, the taxi request includes the recipient's contact information, such as phone number, messaging interface (e.g. texting app), email, etc. The taxi request can be made in any suitable manner, such as using wired or wireless communication devices (e.g. mobile phones), desktop computers, home control panel (for a home automation system), etc. The request can be made through any *sui*table type of interface, such as website with a browser, specialized programs (e.g. smartphone apps), telephone menu, an automated system, etc.

In some cases, the taxi request further includes information about the item being delivered. This information can be useful in assigning a suitable vehicle for the delivery task. Examples of such useful information include the dimensions of the item, weight of the item, whether it is hot food that needs a heated compartment, or cold food that needs a cooled compartment, etc. For example, if the item is a hot food item, a vehicle having a heated compartment can be assigned. Or for example, if the item is a cold food item, then a vehicle having a refrigerated compartment can be assigned. If the item is relatively small, a smaller vehicle can be assigned, and other such accommodations or optimizations for using the fleet of available vehicles.

Drive to Sender

The unmanned vehicle travels, being driven at least partly in an autonomous manner, to the sender's designated location via a paved roadway. The sender may be notified (e.g. by the operations hub) that the vehicle is on its way and/or has arrived. Upon arrival at the sender's designated location, the vehicle is loaded with the item(s) to be sent. After loading the vehicle, the vehicle is made to proceed to the recipient's location. This may be accomplished in any suitable manner, such as closing the cargo compartment door and pressing a button indicating that the item has been loaded.

Drive to Recipient

The unmanned vehicle travels, being driven at least partly in an autonomous manner, to the recipient's location via a paved roadway. The recipient may be notified that the vehicle is on its way and/or has arrived. In some cases, one or more of the packaging used for making the delivery is reusable and intended to be returned to the sender or the home base facility. For example, the container holding the cold food items may be designed for reuse. The recipient removes the container from the vehicle and unpacks it (e.g. move the cold food items into the refrigerator). During this time, the vehicle will stand-by until the container is returned to the vehicle.

After making the delivery, the vehicle may then (1) return to a home base facility; (2) travel to another recipient's location to make another delivery; (3) travel back to the sender's designated location to pick-up another item for delivery; (4) travel to another sender's designated location; or (5) travel to a waiting area as described above.

Service Operating Area

Figure 11:
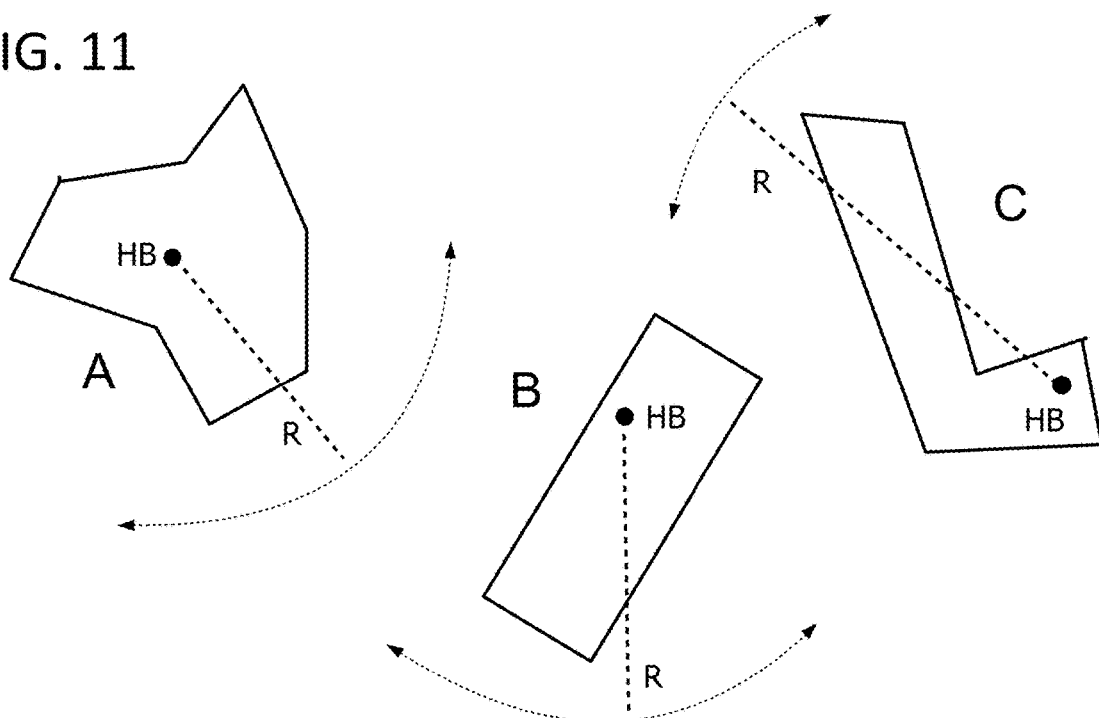
FIG. 11 shows examples of how operating areas may appear in regards to shape.

As the vehicle travels from place to place, having the vehicle stay within relatively close proximity to the home base facility can be a useful feature in case the unmanned vehicle experiences problems. If the unmanned vehicle becomes disabled, a recovery truck can be dispatched from the home base facility to reach the disabled vehicle quickly. As such, in some embodiments, as the unmanned vehicle travels from place to place, the area in which the vehicle operates (operating area) is contained within a 15 mile radius around the home base facility; in some cases, within a 12 mile radius; in some cases, within a 9 mile radius; in some cases, within a 6 mile radius. In addition to proximity to the home base facility, the operating area may be planned in consideration of many factors such as the local geography, road layouts, population density, natural and man-made obstacles, traffic patterns, etc. Examples of operating areas are shown in FIGS. 11 (A, B, and C), drawn as polygonal shapes. In each case, the vehicle's operating area is contained within a radius R around the home base facility HB.

Figure 12:
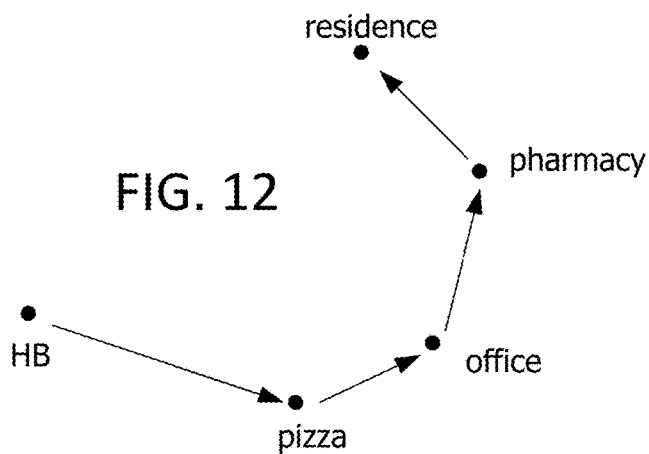
FIG. 12 shows an example of how an autonomous unmanned road vehicle can be used to make deliveries from a home base facility.

FIG. 12 shows an example of how our invention might be implemented. The delivery service provider has a fleet of unmanned ground vehicles at the home base facility (HB) that are ready to receive requests for making deliveries. Someone at an office building calls a pizza restaurant and places an order for a pizza for delivery to the office location. The pizza restaurant begins preparing the pizza and requests a taxi delivery vehicle from the delivery service indicating the office building as the delivery destination and the customer's contact information (e.g. cell phone number).

The delivery service assigns one of the unmanned ground vehicles for this delivery job and is sent to the pizza restaurant. The delivery vehicle self-drives to the pizza restaurant and the delivery service notifies the pizza restaurant that the vehicle is on its way. When the vehicle arrives at the sender's location, the pizza restaurant may be notified of its arrival.

One of the pizza restaurant staff loads the customer's pizza into the vehicle's cargo compartment. The staff person presses a button on the vehicle indicating that the delivery item is loaded. The vehicle then self-drives to the designated office building. The delivery service notifies the customer that the vehicle is on its way and/or has arrived (e.g. by a text message). The delivery service also gives the customer an access code for unlocking the cargo door on the vehicle. The customer goes to meet the vehicle and enters the correct access code to open the cargo door to take delivery of the pizza. The vehicle then leaves and returns to the home base or proceeds to its next task.

In this instance, the delivery service has also received a request from a pharmacy to deliver medications to an elderly patient at her residence. This same vehicle is determined to be the one in closest proximity and is therefore selected for this next delivery task. As instructed, the vehicle self-drives from the office building to the pharmacy and the delivery service notifies the pharmacy that the vehicle is on its way. When the vehicle arrives at the pharmacy, the pharmacy may be notified of its arrival.

One of the pharmacy staff loads the medication into the vehicle's cargo compartment. The staff person presses a button on the vehicle indicating that the delivery item is loaded. The vehicle then self-drives to the designated customer residence. The delivery service notifies the customer that the vehicle is on its way and/or has arrived (e.g. by a phone call). The delivery service also gives the customer an access code for unlocking the cargo door on the vehicle. When the vehicle arrives, the customer (or someone on her behalf) enters the access code and takes the medication. The vehicle then leaves and returns to the home base, goes to a waiting area, or proceeds to its next task. As the vehicle travels from the home base facility to the pizza restaurant, to the office building, to the pharmacy, and to the patient's residence, the vehicle stays in an operating area that is contained within a 15 mile radius around the home base.

Regional Delivery Network

Our invention can also be implemented over a wider region using multiple home base facilities distributed over a geographic area. This feature may be useful for implementing our invention in a metropolitan area (such as the Maryland/Virginia/DC metro area). The vehicle may travel from place to place throughout the delivery region while being kept in relatively close proximity to a home base facility. As explained above, this can be a useful feature in case the vehicle experiences problems on the road.

As such, in some embodiments, our invention uses a network of multiple home base facilities in a delivery region. The network of home base facilities allows the vehicle to roam throughout the delivery region. As such, in some embodiments, each home base facility in the delivery region is within a 9 mile radius of at least one other home base facility; in some cases, within a 6 mile radius; in some cases, within a 3 mile radius.

In some embodiments, all the home base facilities of the regional network are contained within a circle (e.g. as drawn on a map) having a radius of 64 miles; in some cases, 48 miles radius; in some cases, 36 miles radius; in some cases, 24 miles radius; in some cases, 18 miles radius; in some cases, 12 miles radius.

To keep the vehicle in close proximity to a home base facility, in some embodiments, the overall area in which the vehicle operates is contained within two or more adjoining or overlapping circles that each have a radius of 9 miles around a home base facility; in some cases, each having a radius of 6 miles; in some cases, each having a radius of 3 miles.

Figure 13:
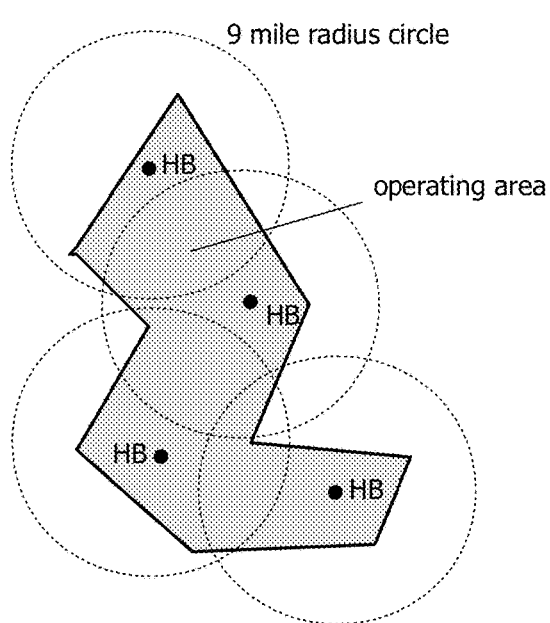
FIG. 13 shows another example of an operating area for an autonomous unmanned road vehicle in a regional delivery network.

FIG. 13 shows an example of an operating area for a vehicle. The operating area for a particular unmanned vehicle is shown in gray shading. The regional delivery network has four home base facilities HB. The drawing figure also shows a circle of 9 mile radius centered around each home base facility. As shown here, the vehicle's operating area is contained within the four overlapping circles.

Figure 14:
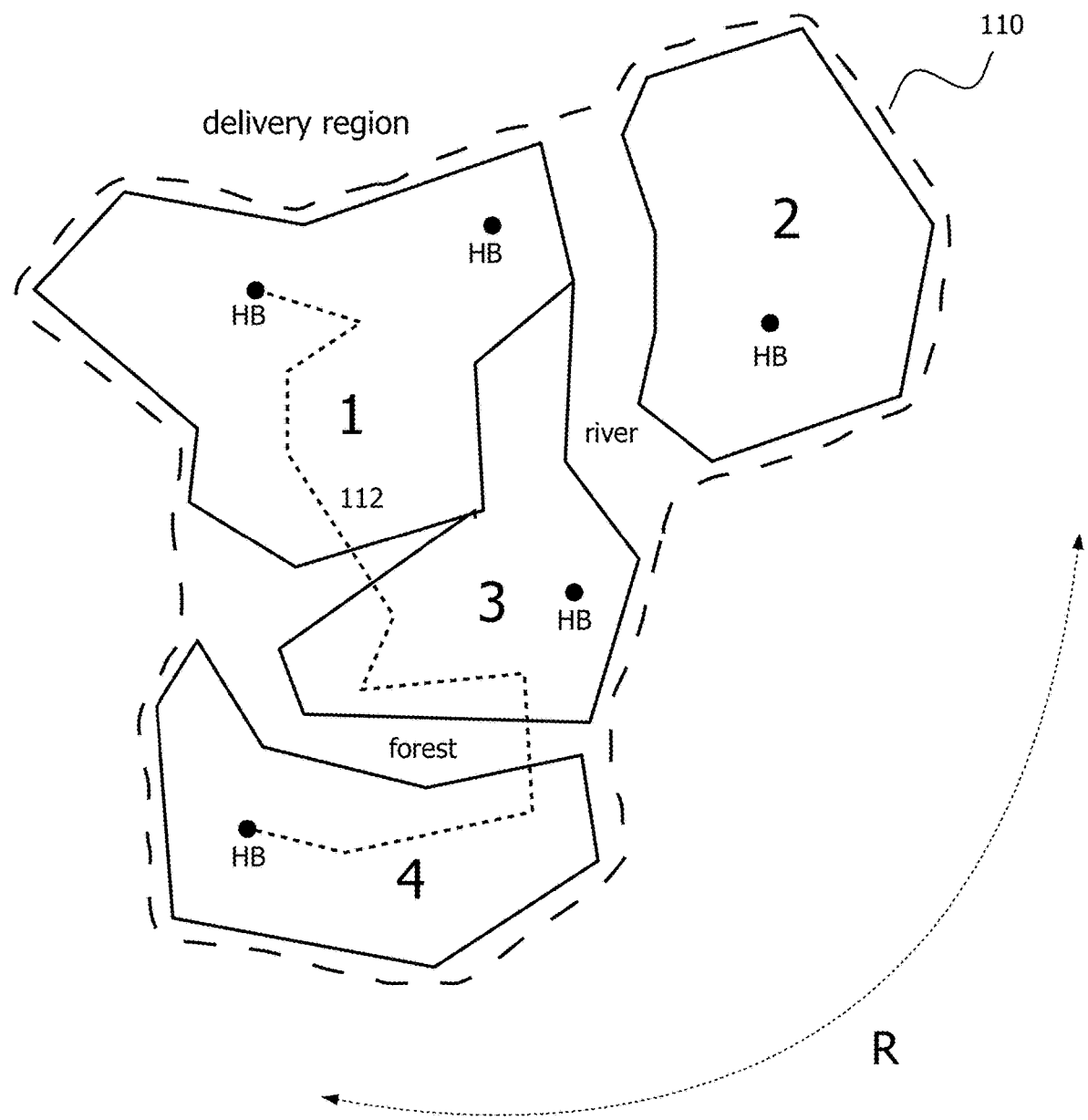
FIG. 14 shows an example of a regional delivery network.

FIG. 14 shows an example of a regional delivery network. The delivery region is defined by the outer dashed line 110 around a geographic region that includes a river and a forest area. There are four service areas (designated as numbers 1, 2, 3, and 4) in the region. Each service area has one or more home base facilities HB. Each home base facility in the delivery region is within a 9 mile radius of at least one other home base facility. Moreover, for this regional network, all the home base facilities are contained within a circle having a radius of R. The dashed line inside the delivery region shows an example of a route 112 taken by an unmanned ground vehicle as it takes multiple service calls throughout the day. These service calls take the unmanned vehicle from the home base facility in service area 1 into service area 3 and ultimately ends at the home base facility for service area 4.

The foregoing description and examples have been set forth merely to illustrate our invention and are not intended to be limiting. Each of the disclosed aspects and embodiments of our invention may be considered individually or in combination with other aspects, embodiments, and variations of our invention. Modifications of the disclosed embodiments incorporating the spirit and substance of our invention may occur to persons skilled in the art, and such modifications are within the scope of our invention.

The invention claimed is:

1. An autonomous unmanned road vehicle comprising:
    a cargo compartment;
    a power source for propelling the vehicle;
    an external keypad for entering an access code, wherein entry of a correct access code gives access to the cargo compartment;
    radio communication equipment;
    wherein the vehicle has a total cargo volume of less than 100 cubic feet;
    wherein the vehicle has a wheelbase of at least 60 inches and an empty weight of at least 700 pounds;
    wherein the vehicle does not have any passenger seats;
    wherein the vehicle is capable of autonomous driving on a paved roadway.

2. The autonomous vehicle of claim 1, further comprising an external loudspeaker and an external microphone.

3. The autonomous vehicle of claim 2, further comprising a control system that is programmed for autonomous driving of the vehicle on a roadway, and to monitor a condition of the vehicle and assess technical problems being experienced by the vehicle.

4. The autonomous vehicle of claim 2, wherein access to the cargo compartment is located only on a right side of the vehicle.

5. The autonomous vehicle of claim 2, wherein access to the cargo compartment is not located on a left side of the vehicle.

6. The autonomous vehicle of claim 1, further comprising a control system that is programmed for autonomous driving of the vehicle on a roadway, and to monitor a condition of the vehicle and assess technical problems being experienced by the vehicle.

7. The autonomous vehicle of claim 6, wherein access to the cargo compartment is located only on a right side of the vehicle.

8. The autonomous vehicle of claim 1, wherein access to the cargo compartment is located only on a right side of the vehicle.

9. The autonomous vehicle of claim 1, wherein access to the cargo compartment is not located on a left side of the vehicle.

10. The autonomous vehicle of claim 1, further comprising:
   a perception system for detecting objects around the vehicle;
   a surveillance system that includes a multidirectional camera system that has one or more cameras for imaging in multiple directions, wherein the surveillance system is in operation even when the vehicle is not traveling or when the perception system is not active.

11. The autonomous vehicle of claim 1, wherein vehicle speed is limited to a maximum allowable speed V, wherein V is a value of 65 mph or less.

12. The autonomous vehicle of claim 11, wherein the vehicle is capable of traveling at a speed faster than 35 mph.

13. The autonomous vehicle of claim 1, wherein the vehicle comprises wheels with tires that are non-pneumatic or semi-pneumatic.

14. The autonomous vehicle of claim 13, wherein the vehicle does not have a fully independent suspension system on all the wheels.

15. The autonomous vehicle of claim 1, wherein the vehicle comprises a forward facing light for illumination and a signal light for signaling to other traffic.

16. The autonomous vehicle of claim 1, wherein the vehicle is capable of autonomously changing lanes on a roadway and autonomously making turns at intersections.

17. The autonomous vehicle of claim 16, further comprising a navigation system that uses a map that contains locations of parking spaces.

18. The autonomous vehicle of claim 1, wherein the vehicle is configured to communicate with an operations hub that has personnel to remotely operate the vehicle, and wherein the vehicle is driven by a combination of human and autonomous control.

19. The autonomous vehicle of claim 1, wherein the vehicle does not have a steering wheel and does not have an audio entertainment system.

20. The autonomous vehicle of claim 1, wherein the vehicle's maximum payload capacity is at least 300 lbs.

* * * * *